(12) United States Patent
Ford

(10) Patent No.: US 11,614,769 B2
(45) Date of Patent: Mar. 28, 2023

(54) ASYNCHRONOUS DISTRIBUTED COORDINATION AND CONSENSUS WITH THRESHOLD LOGICAL CLOCKS

(71) Applicant: ECOLE POLYTECHNIQUE FEDERALE DE LAUSANNE (EPFL), Lausanne (CH)

(72) Inventor: Bryan Ford, Lausanne (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 0 days.

(21) Appl. No.: 16/928,680

(22) Filed: Jul. 14, 2020

(65) Prior Publication Data

US 2021/0018953 A1    Jan. 21, 2021

Related U.S. Application Data

(60) Provisional application No. 62/874,276, filed on Jul. 15, 2019.

(51) Int. Cl.
| | | |
|---|---|---|
| G06F 1/04 | (2006.01) | |
| G06F 1/12 | (2006.01) | |
| G06F 5/06 | (2006.01) | |
| G06F 1/10 | (2006.01) | |
| G06F 1/14 | (2006.01) | |

(52) U.S. Cl.
CPC .............. *G06F 1/10* (2013.01); *G06F 1/14* (2013.01)

(58) Field of Classification Search
CPC ........................................... G06F 1/10
See application file for complete search history.

(56) References Cited

U.S. PATENT DOCUMENTS

| | | | |
|---|---|---|---|
| 6,215,763 B1* | 4/2001 | Doshi ................ | H04J 14/0241 370/216 |
| 9,460,183 B2* | 10/2016 | Dalton ............... | G06F 11/2097 |
| 2013/0111261 A1* | 5/2013 | Dalton ............... | G06F 11/2028 714/E11.073 |
| 2019/0089716 A1* | 3/2019 | Stocker .............. | H04L 67/1095 |
| 2019/0243820 A1* | 8/2019 | Shen ................... | G06F 16/00 |
| 2019/0334699 A1* | 10/2019 | Tang ................... | H04L 67/32 |
| 2020/0014745 A1* | 1/2020 | Thurimella ......... | H04L 63/0428 |
| 2020/0394183 A1* | 12/2020 | Jois .................... | G06F 16/9024 |
| 2021/0328803 A1* | 10/2021 | Kanza ................. | H04L 9/3247 |

OTHER PUBLICATIONS

L. Lamport, "The Part-Time Parliament", ACM Transactions on Computer Systems, vol. 16, No. 2, May 1998, pp. 133-169.

(Continued)

*Primary Examiner* — Mohammed H Rehman
(74) *Attorney, Agent, or Firm* — Blank Rome LLP

(57) ABSTRACT

Consensus protocols for asynchronous networks are usually complex and inefficient, leading practical systems to rely on synchronous protocols. The invention proposes an approach to simplify asynchronous consensus by building it atop a novel threshold logical clock abstraction, allowing the consensus protocol to operate in "virtual synchrony." Leveraging accountable state machine techniques to detect and suppress Byzantine nodes, and verifiable secret sharing for random leader election, we obtain simple and efficient protocols for asynchronous Byzantine consensus.

12 Claims, 7 Drawing Sheets

(56) References Cited

OTHER PUBLICATIONS

B. Ford, et a., "Que Sera Consensus: Simple Asynchronous Agreement with Private Coins and Threshold Logical Clocks", https://arxiv.org/abs/2003.02291, Mar. 6, 2020, 29 pgs.

L. Lamport, et al., "Byzantine Clock Synchronization", ACM, 1984, pp. 68-74.

A. Sobeih, et al., "Almost Peer-to-Peer Clock Synchronization", IEEE, 2007, 10 pgs.

K. Iwanicki, et al., "Gossip-Based Clock Synchronization for Large Decentralized Systems", IEEE, 2006, 15 pgs.

R. C. Merkle, "A Digital Signature Based on a Conventional Encryption Function", Advances in Cryptology—CRYPTO '87, LNCS 293, 1988, pp. 369-378.

S. Haber, et al., "How to Time-Stamp a Digital Document", Journal of Cryptology, vol. 3, No. 2, 1991, pp. 99-111.

S. A. Crosby, et al., "Efficient Data Structures for Tamper-Evident Logging", USENIX Security Symposium, usenix.org; 2009, 17 pgs.

P. M. M. Baker, "Secure History Preservation Through Timeline Entanglement", Proceedings, $11^{th}$ Annual USENIX Security Symposium—Technical Paper, 2002, pp. 297-312.

J. C. Corbett, et al., "Spanner: Google's Globally Distributed Database", ACM Transactions on Computer Systems, vol. 31, No. 3, Article 8, Aug. 2013, pp. 8:1-8:22.

\* cited by examiner

ASYNCHRONOUS DISTRIBUTED COORDINATION AND CONSENSUS WITH THRESHOLD LOGICAL CLOCKS

RELATED APPLICATION

The present application claims priority of US provisional patent application U.S. 62/874,276, filed on Jul. 15, 2019, the contents of which is hereby incorporated by reference.

SUBJECT OF THE INVENTION

The invention is related to a new asynchronous consensus method in which the handling of time is decomposed from the consensus process itself.

DESCRIPTION OF RELATED ART

In telecommunication networks, nodes can communicate by sending and receiving messages. For example, a node can broadcast a message to the group by sending n identical messages, one to each member including itself.

In the present application, a node can be implemented or performed by any kind of hardware and/or software equipment, such as a programmable device, machine, a microprocessor, a state machine, a digital signal processor (DSP), an application specific integrated circuit (ASIC), a FPGA, other programmable logic device, discrete gate or transistor logic, discrete hardware components, software agents or modules, or any combination thereof.

Multiple nodes may be connected by any type of networks. In order to exchange data and/or to perform some operations, they need to find a consensus on a common notion of time.

Consensus methods are used in multi nodes systems where an agreement needs to be found among a plurality of nodes for a single data value. One approach to generating consensus is for all processes (agents) to agree on a value. However, some of the processes (agents) may fail or be unreliable in other ways, so consensus protocols must be fault tolerant.

Most consensus protocols deployed in practice are derived from Paxos as described in Leslie Lamport, The Part-Time Parliament. ACM Transactions on Computer Systems, 16(2):133-169, May 1989, and in Leslie Lamport. Paxosmade simple. ACMSIGACT News, 32(4):51-58, December 2001, Paxos relies on leader election and failure detection via timeouts. Despite decades of refinements and reformulations, consensus protocols remain complex, bug-prone even with formal verification, and generally difficult to understand or implement correctly. Because they rely on network synchrony assumptions for liveness, their performance is vulnerable to slow leaders or targeted network denial-of-service attacks.

Fully-asynchronous consensus algorithms address these performance vulnerabilities in principle, but are even more complex, often slow and inefficient in other respects, and rarely implemented in practical systems. The most practical asynchronous consensus algorithms in particular rely on common coins, which in turn require even-more-complex distributed setup protocols Consensus protocols become even more complex and fragile when we want them to tolerate Byzantine node failures.

Because relying on synchrony assumptions and timeouts can make consensus protocols vulnerable to performance attacks and routing-based attacks, there is a need for a method that allows for both adversarial nodes and an adversarial network.

One of the problems with consensus protocols is to define a logical clock protocol. Methods would be desirable that can define a threshold logical dock protocol, which synthesizes a virtual notion of time among nodes on an asynchronous network. Other protocols, including consensus protocols, may then be built more simply atop such a protocol as if on a synchronous network.

Lamport clocks, vector clocks and matrix clocks are already known, in which a notion of virtual time is defined by labelling an unconstrained event history to enable before/after comparisons.

Lamport clocks and typical notions of virtual time built on them assume all the participants are well-behaved. However, misbehaving Byzantine nodes can cause the global clock to run either "too slow" or "too fast."

There is therefore a need to define a method for assigning a logical time step to a plurality of nodes in a network that can ensure that even in the presence of misbehaving Byzantine nodes, the well-behaved nodes remain broadly synchronized, and that faulty nodes cannot cause the global clock to run either "too slow" or "too fast."

BRIEF SUMMARY OF THE INVENTION

According to one aspect, this need is fulfilled with a method for assigning a logical time step to one node among a plurality of nodes in a network, wherein the logical time step is represented by a monotonically-increasingly integer, wherein the node is only authorised to increment its logical time step after a coordination with a number of nodes equal or superior to a first predefined threshold.

In the present application, such a method will be called "Threshold Logical Clock" method or TLC. A node to which a logical time step us assigned with the TLC method of claim 1 is called a TLC node.

While the purpose of Lamport clocks and vector clocks is to create a notion of virtual time usable to compare an unconstrained set of partially-ordered events, TLC's purpose is to impose constraints on events so as to create a logically synchronous notion of time, atop which other protocols may be built more easily as if on a synchronous network.

Different nodes may reach a given logical time step at different real-world times.

The TLC method of claim 1 is designed to operate in the presence of failed or Byzantine nodes.

The TLC method labels and constrains events to ensure that a threshold of nodes in a group progress through logical time in a quasi-synchronous "lock-step" fashion.

In one embodiment, a node reaches a next logical time step (s+1) only after having received messages broadcasted at a given logical time step (s) by a number of nodes equal or superior to the first predefined threshold.

In one embodiment, a node is only authorised to increment its logical time step after said node has seen one of his messages acknowledged by a number of other nodes larger than a second predefined threshold.

Therefore, a node reaches a time step s+1 only after a threshold of all participating nodes has reached time s and a suitable threshold amount of "round-trip" communication has demonstrably occurred since then.

A particular protocol instance $TLC(t_m, t_w, n)$ is parameterized by message threshold $t_m$, witness threshold $t_w$, and number of nodes n. This means that to reach time s+1, a node i must have received messages m broadcast at time s by at least $t_m$ of the rt nodes, and t must have seen each of those $t_m$, messages acknowledged by at least $t_w$ of the n nodes.

In a Byzantine environment, the TLC method of the invention ensures that malicious nodes cannot advance their clocks either "too fast" (running ahead of honest nodes) or "too slow" (trailing behind the majority without catching up).

It becomes simpler to build other useful protocols atop TLC's logical notion of time, such as threshold signing, randomness beacons, and consensus.

The first predefined threshold is preferably larger than half the number of nodes in the network, so that a node is only authorised to reach its next logical time step after having received messages from a majority of nodes in said network from the previous logical time step.

The method may comprise a step of delineating the real-word time into periods according to the moment a majority of the nodes in the network have reached successive logical time steps.

Each node preferably maintains a tamper-evident log in which each entry is digitally signed by the node and linked to prior entries by a hash, to enable other nodes to replay and verify the node's decisions.

Each node may store its history in a blockchain, that grows by one record at each logical time step.

The logical time steps may be used to build an asynchronous time service for trustworthy clock initialization or synchronization.

The logical time steps may be used in an encrypted time vault or time capsule service enabling clients to encrypt data that can only be decrypted at a specific future time.

The logical time steps may be used to build a timestamping service enabling clients to prove that a specific data existed at a specific time.

The invention is also related to a programmable equipment implementing such a TLC node and programmed so as to perform the method of one of the previous claims.

The invention is further related to a system comprising a plurality of such TLC nodes mutually connected over a network.

According to one aspect, the invention is also related to one method where participating nodes each propose a potential value to agree on a block in a blockchain), then simply "wait" a number of TLC time steps, recording and gossiping their observations at each step. We will refer to this method as a method relying on a que sera consensus or QSC.

In QSC, after the appropriate number of logical time steps have elapsed, the participants decide independently on the basis of public randomness and the history they observed whether the consensus round succeeded and, if so, which value was agreed on. This "propose, gossip, decide" approach relates to DAG-based blockchain consensus proposals, which reinvent and apply classic principles of secure timeline entanglement and accountable state machines.

To handle network asynchrony, including adversarial scheduling, it has been found is that it is sufficient to associate random tickets with each proposed value or block for symmetry-breaking, while ensuring that the network adversary cannot learn the random ticket values until the communication pattern defining the consensus round has been completed and indelibly fixed.

In a Paxos-equivalent version of the consensus protocol for n=2f+1 well-behaved, "fail-stop" nodes, we ensure this network adversary obliviousness condition by encrypting each node's self-chosen ticket, keeping it secret from the network adversary until the consensus round's result is a fait accompli.

To tolerate f Byzantine nodes colluding with the network adversary, as usual we need n=3f+1 nodes total. We rely on gossip and transferrable authentication (digital signatures), and treat ail participants as accountable state machines in the PeerReview framework to handle equivocation and other detectable misbehavior by faulty nodes. We use threshold public randomness via secret sharing to ensure that the adversary can neither learn nor bias proposal ticket values until all critical communication has completed.

With these tools, we build two asynchronous Byzantine consensus protocols embodying different trade-offs. A fat consensus protocol builds on the TLC protocol configured with the message and acknowledgment thresholds $t_m=t_a=2f+1$ (i.e., TLC(2f+1,2f+1, 3f+1)). This approach requires $O(n^2)$ total messages per TLC time step, but simplifies reasoning. The thin consensus protocol requires no TLC acknowledgments (i.e., TLC(2f+1, 0, 3f+1)). This approach incurs only O(n) messages per time step, but requires more time steps.

TLC and the above consensus protocols assume an exceptionally-strong threat model, which conceptually decouples the adversary's powers to attack the system's integrity versus its progress, independently maximizing each power. The adversary can attack integrity by adaptively corrupting a set Sc of up to f nodes and their in-transit messages anywhere in the network. In addition, the adversary can attack progress not only by scheduling message deliveries arbitrarily, but also can choose—and change at any time—an independent set Sd of nodes whose messages the adversary may delay indefinitely, an exemption from the usual asynchrony requirement of eventually delivering all messages.

The TLC method provides a metric for time defined by the rate at which a threshold of nodes can in fact communicate with each other, varying as needed according to those nodes' actual ability to communicate.

Byzantine relies on transferable authentication, accountable state machines, threshold randomness, threshold signing.

Each node maintains its own log of all nondeterministic inputs affecting its state: mainly the record of messages it received in the order it received them, but also the nondeterministic inputs the node itself injects into the system when permitted: e.g., the contents of proposed values or blocks for consensus. Also the random elements of signatures or zero-knowledge proofs.

Apart from each node's nondeterministic input logs, all other aspects of the node's state and behavior is strictly deterministic and may be (and is) verified independently by all other nodes.

According to one aspect, the invention relates to a threshold logical clock (TLC) layer as a substrate providing a communication-driven, timeout free notion of time atop an asynchronous network to simplify and pace higher-level distributed protocols, ensuring that coordinated nodes advance together in lock-step ("quasi-synchronously") as quickly as communication over the underlying network permits. (Section 4)

According to one aspect, the invention relates to a threshold logical dock incorporating threshold witnessing as a way to ensure proactively that a substantial fraction (e.g., a majority or supermajority) of messages broadcast at each logical time-step have reached other nodes by the end of that timestep, and as a way to allow nodes to determine which subset(s) of messages have propagated in this way. (Section 4.5)

According to one aspect, the invention relates to an enforcement of causally-ordered message delivery in TLC, using mechanisms such as vector clocks, to ensure that broadcasts by all nodes are delivered in causally consistent order to other nodes, thereby simplifying the reasoning about information propagation in quasi-synchronous protocols building atop TLC. (Section 4.2)

According to one aspect, the invention relates to the delineation of real-world time into periods according to the moment a majority of participating TLC nodes reach successive logical time steps, in order to simplify further protocols built atop TLC, both by constraining the earliest time any message labeled with a time step s can have been sent (i.e., not before real time period s started), and by constraining the latest time any received message labeled s can have been formulated (i.e., not after real time period s ended). (Section 4.7)

According to one aspect, the invention relates to the use of TLC as an automatic reliable broadcast protocol ensuring that all messages sent and threshold witnessed during any step s will be seen by all participating nodes by step s+2, provided the message and witnessing thresholds are majoritarian n/2). (Section 4.8)

Basic Services Built on Logical Clocks:

According to one aspect, the invention relates to the use of TLC to build an asynchronous network time service for trustworthy clock initialization and synchronization (Section 5.1.1).

According to one aspect, the invention relates to the use of TLC to build a distributed trusted timestamping service enabling clients to prove that a specific document or other data existed in original, unmodified form at a specific historical time (Section 5.1.2).

According to one aspect, the invention relates to the use of TLC to build an encrypted time vault or time capsule service enabling clients to encrypt data so as to be decryptable only att a specific future time (Section 5.1.3).

According to one aspect, the invention relates to the use of TLC to build an asynchronous public randomness beacon that transparently publishes unpredictable, unbiasable random numbers as frequently as group configuration and network connectivity permits (Section 5.2).

According to one aspect, the invention relates to the use of TLC to build an asynchronous consensus protocol (Section 6).

According to one aspect, the invention relates to an asynchronous consensus protocol built atop TLC in which every participating node proposes a message in the first time step of each round (s+0), waits a fixed number of TLC time steps, then uses history information recorded and exchanged between nodes by TLC to determine the result of consensus.

According to one aspect, the invention relates to an asynchronous consensus protocol in which each participating node maintains an independent possible history, represented by a tamper-evident log or blockchain, that grows by one record each TLC timestep (Section 6.1).

According to one aspect, the invention relates to an asynchronous consensus protocol in which each node, at certain TLC time steps, chooses to adopt another randomly-chosen node's history or blockchain in place of its own, yielding in a form of genetic consensus over time while paced by TLC (Section 6.2).

According to one aspect, the invention relates to an asynchronous consensus protocol in which each node chooses a random number to attach to its proposal, which serves as an artificial "genetic fitness" metric in that other nodes choose the most fit proposal they are aware of to build on in the next round to accelerate genetic consensus (Section 6.3).

According to one aspect, the invention relates to an asynchronous consensus protocol in which each node chooses protocols to build on in the next round only from those it deems eligible, by virtue of having been confirmed or threshold witnessed and thus confirmed to have propagated to a majority of nodes (Section 6.4).

According to one aspect, the invention relates to an asynchronous consensus protocol in which all nodes wait two TLC time-steps after broadcasting their proposals, so that all confirmed proposals that were threshold witnessed in the first step (by s+1) will be known to all nodes by the end of the second step (s+2) (Section 6.5).

According to one aspect, the invention relates to an asynchronous consensus protocol in which each node tests whether a proposal has been doubly confirmed or reconfirmed, so that it knows that such a proposal's confirmed status will have propagated to all nodes by the third TLC step (s+3) (Section 6.6).

According to one aspect, the invention relates to an asynchronous consensus protocol in which each node determines, via analysis of the round's history exchanged between nodes by TLC, in which consensus rounds all nodes will finally choose the same best eligible (confirmed) proposal (Section 6.7).

According to one aspect, the invention relates to an asynchronous consensus protocol ensuring that an adversarial network cannot learn the genetic fitness lottery tickets associated with proposals before the consensus round completes (Section 6.8).

According to one aspect, the invention relates to a threshold logical clock protocol in which each node maintains a local tamper-evident log, in which each entry is digitally signed by the node and linked to prior entries via cryptographic hashes, to enable other participating nodes to replay and validate the node's decisions and actions affecting the group (Section 7.1).

According to one aspect, the invention relates to a threshold logical dock protocol in which each node deterministically replays other nodes' decisions, based on the causal history leading up to that decision as recorded in that and other nodes' logs, to ensure that the verified node correctly implemented both the threshold logical clocks logic and any deterministically verifiable state machine logic of protocols built atop the TLC layer (Section 7.1.2).

According to one aspect, the invention relates to a threshold logical clock protocol in which each node uses cryptographic hashes to gossip and verify with other nodes that every node digitally signs only one message for a given sequence number, and if a violation of this is ever discovered (equivocation), the correct nodes expose and gossip proofs of this misbehavior (Section 7.1.3).

According to one aspect, the invention relates to a threshold logical clock protocol in which correct nodes use tamper-evident logging and verification to ensure that all other nodes advance their logical clocks correctly, and never advance them too quickly or slowly or turn them back (Section 7.2.1).

According to one aspect, the invention relates to a threshold logical clock protocol designed for a threat model that takes two independent configuration parameters, $f_a$ describing the maximum number of nodes that might be unavailable or unreachable, and $f_c$ describing the maximum number of nodes that might be corrupt and maliciously colluding (Section 7.2.2).

According to one aspect, the invention relates to a threshold logical clock protocol that uses threshold witness cosigning to protect correct nodes against equivocation immediately and proactively, and not just eventually, provided the witness threshold satisfies the constraints $$\frac{n+f_c}{2} < t_w \leq n - f_a$$

and nodes depend only on witness cosigned messages to be non-equivocating (Section 7.2.3).

According to one aspect, the invention relates to a threshold logical clock protocol that uses logging and verification to ensure that corrupt nodes cannot produce a message for a time step s+1 or later that correct nodes will accept, before a majority of correct nodes have reached step s and global time period s has begun, provided the message threshold satisfies the constraints $$\frac{n+f_c}{2} < t_w \leq \overline{n} - f_a$$

(Section 7.2.4).

According to one aspect, the invention relates to a threshold logical clock protocol that uses logging and verification to ensure that corrupt nodes cannot formulate a new message for a time step s or before and get it threshold witnessed in a way correct nodes will accept, after a majority of correct nodes have reached step s+1 and global time period s+1 has begun, provided the witness threshold satisfies the constraints $$\frac{n+f_c}{2} < t_w \leq n - f_a$$

(Section 7.2.4).

According to one aspect, the invention relates to a threshold logical clock protocol that uses logging and verification to ensure that corrupt nodes cannot violate the guarantee that any message threshold witnessed at a given time step s will be known to all nodes—and will appear in the causal histories of all nodes, even corrupt nodes producing valid logs, by the time those nodes reach step s+2 (Section 7.2.5).

According to one aspect, the invention relates to a Byzantine consensus protocol that builds on a Byzantine-protected threshold logical protocol such as that above (Section 7.4).

According to one aspect, the invention relates to a Byzantine consensus protocol that leverages the logging, deterministic replay, and verification mechanisms in the threshold logical clocks layer to protect the core logic of the Byzantine consensus protocol as well (Section 7.4.1).

According to one aspect, the invention relates to a Byzantine consensus protocol that builds on threshold logical docks and that associates genetic fitness lottery tickets with proposals so that no one, including the node making the proposal, can predict or bias the lottery ticket value before the round completes Section 7.4.2).

According to one aspect, the invention relates to a Byzantine consensus protocol that builds on threshold logical clocks and generates lottery tickets each round using a joint publicly verifiable secret sharing (PVSS) scheme to ensure that each proposer chooses its ticket fairly in a verifiably unpredictable and unbiased fashion, using a combination of secrets dealt by at least $f_c+1$ nodes to ensure that at least one of those secrets is from a correct node (Section 7.4.3).

According to one aspect, the invention relates to a distributed key generation (DKG) protocol that builds on threshold logical clocks to generate a threshold-secret-shared public/private keypair, such that no one can learn the composite private key but a threshold of group members can coordinate to use the shared private key jointly for a variety of cryptographic operations and applications (Section 8).

According to one aspect, the invention relates to a distributed key generation protocol built atop threshold logical clocks in which each node deals a matrix of verifiable threshold secret shares such that any correct node that receives an incorrect share in a deal can recover the correct share from recovery shares verified correct by a threshold of correct nodes (Section 8.2).

BRIEF SUMMARY OF THE INVENTION

The invention will be better understood with the detailed description illustrated with the figures in which:

FIG. 1 illustrates three nodes A, B, C which waits to receive a threshold number of messages at each logical time step (2 of 3 including its own in this example). Darker arrows indicate messages that enable nodes to progress; the rest arrive "too late" to contribute to time advancement. The figure also shows that different nodes switch to a new time step at different real times.

FIG. 6 illustrates the Strawman 2 embodiment, in which each node's proposal at each time step includes a random genetic fitness. At the next step, each node A, B, C chooses the most "fit" proposal from the previous step to build on.

Figure 13:
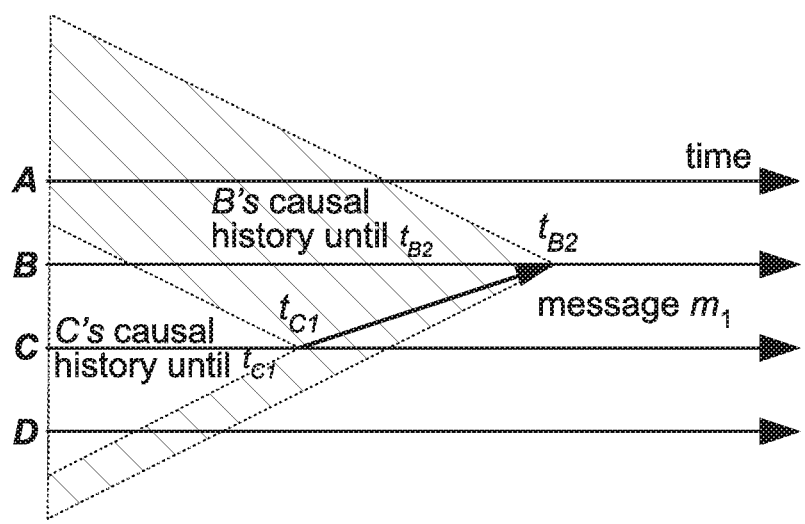

FIG. 13 schematically illustrates causal history cones enforced by the vector time layer.

DETAILED DESCRIPTION OF POSSIBLE EMBODIMENTS OF THE INVENTION

We now introduce Threshold Logical Cocks (TLC) and explore their properties informally, emphasizing simplicity and clarity of exposition for now. For now we consider only the non-Byzantine situation where only the network's scheduling of message delivery, and none of the participating nodes themselves, may exhibit adversarial behavior.

4.1 Time Advancement in Basic TLC

TLC assumes at the outset that we have a well-defined set of participating nodes, each of which can send messages to any other participant and can correctly authenticate messages received from other participants (e.g., using authenticated TLS. Further, in addition to the number n of participants and their identities, TLC requires a message threshold, $t_m$, as a configuration parameter defining the number of other participants a node must "hear from" during one logical time-step before moving on to the next. For simplicity we will assume that $1 < t_m \leq n$.

At any moment in real-world time, TLC assigns each node a logical time step based on its communication history so far. Like Lamport clocks but unlike vector or matrix clocks, TLC represents logical time steps as a single monotonically-increasing integer $s \in N$ with global meaning across all n participating nodes. Lamport clocks give individual nodes, or arbitrarily-small groups of nodes, unconstrained freedom to increment their notion of the current logical time to reflect events they locally observe, or claim to have observed.

TLC instead constrains nodes so that they must coordinate with a threshold $t_m$ of nodes in order to "earn the privilege" of creating a new event and incrementing their notion of the logical time.

At the "beginning of time" when an instance of the TLC protocol starts, all nodes start at logical time-step s=0, and have the right to broadcast to all participants a single initial message labeled with timestamp 0. On reaching this and every subsequent time-step s, each node i then waits to receive messages labeled step s from at least $t_m$ distinct participants, including i itself. At this point, node i has earned the right to advance its logical time to step s+1, and consequently broadcasts a single message labeled s+1 before it must wait again.

Node i does not care which set of $t_m$ participants it received step s messages from in order to meet its threshold and advance to s+1. Critical to tolerating arbitrary (adversarial) network scheduling, i simply takes the first threshold set of messages to arrive, regardless of which subset of participants they came from, then moves on.

Figure 1:
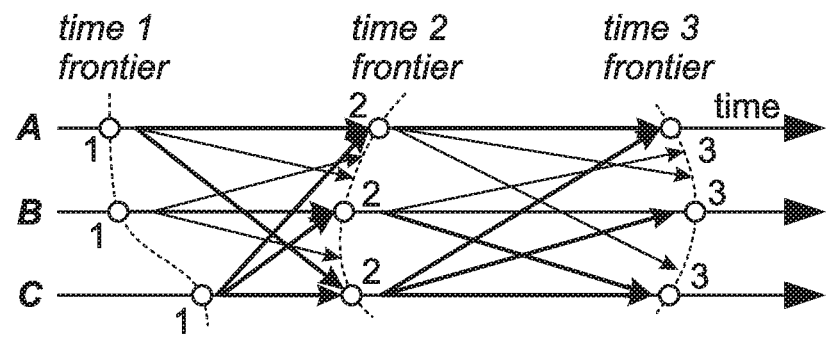

FIG. 1 illustrates this process for a single three-node example with a message threshold $t_m=2$. This TLC configuration requires each node to collect one other node's step s message in addition to its own before advancing and broadcasting its step s+1 message.

Different nodes may start at different real-world wallclock times, and the network may arbitrarily delay or reorder the delivery of any node's message to any other.

This implies that different nodes may reach a given logical time-step at vastly different wall-clock times than other nodes. We refer to the varying sets of real-world times that different nodes arrive at a given logical step s as the time frontier of step s. Since each node advances its logical clock monotonically, the time frontier for each successive step s divides real time into periods "before" and "after" step s from the perspective of any given node i. A given moment in real time may occur before s from one node's perspective but after s for another node.

4.2 Causal Propagation of Messages

To simplify reasoning about logical time and the protocols we wish to build on it, we will assume that any TLC implementation ensures that knowledge propagates "virally" according to a causal ordering. For example, suppose node A sends message 1A at step 1, node B receives it before moving to step 2' and broadcasting message 2B, and node C in turn receives message 2B. In this case, message 1A is causally before 2B. We will assume that the underlying network or overlay protocol, or the TLC implementation itself, ensures that node C learns about message 1A either before or at the same time as C learns about 2B: i.e., in causal order.

We will now describe one way to ensure causal message propagation. Each node i simply includes in every message it sends a record of i's entire causal history: e.g., a complete log of every message i has ever received directly or heard about interactly from other nodes. There are more practical and efficient ways to ensure causally-ordered message delivery:

For now, we will take take causally-ordered message propagation for granted as if it were a feature of the network.

4.3 Viral Advancement of Logical Time

A consequence of the threshold condition for time advancement, combined with causally-ordered message propagation, is that not just messages but also time advancement events propagate virally.

Suppose, for example, that node i is waiting at logical time-step s while another node j has advanced to a later step s'>s arbitrarily far ahead of i. If i receives the message j broadcast at step s', then this delivery causes i to "catch up" instantly to step s'. This is because, due to causal message propagation, i obtains from j not just j's step s' broadcast but also, indirectly, the $t_m$ threshold set of messages j used to advance from s to s+1, those that j used to advance to s+2, etc., up through step s'.

4.4 Information Propagation in TLC

The basic TLC protocol outlined above makes it easy to reason about the information that flowed into a node leading up to a particular time step s+1. Because any node i had to obtain a threshold $t_m$ of step s messages, either directly or indirectly, in order to advance to s+1 at all, this trivially implies that i's "view" of history at step s+1 will contain at least a $t_m$=n fraction of all messages from step s, as well as at all prior steps.

To build interesting protocols atop TLC, however, we will need to be able to reason similarly about information flowing out of a particular node into other nodes after some step s. In particular, after a node i broadcasts its step s message, how can we tell how many nodes have received that message by some future logical time, say s+1? The adversarial network schedule ultimately determines this but it would be useful if we could at least measure after the fact the success (or lack thereof) of a given message's propagation to other nodes. For this purpose, we enhance TLC to support witnessed operation.

4.5 Threshold Witnessed TLC

One way we can determine when a message broadcast by a node has reached other nodes is by requiring the node to collect delivery confirmations proactively, as a new prerequisite for the advancement of logical time. We might, for example, require each node to transmit each of its broadcasts to every other node and await TCP-like acknowledgments for its broadcast. If we require a node to confirm message delivery to all other nodes, or even to any predefined set of other nodes, however, this would present denial-of-service opportunities to the adversarial network, which could arbitrarily delay the critical message or acknowledgment deliveries.

To tolerate full network asynchrony, we must again invoke threshold logic, this time to confirm a message's delivery to any subset of participants meeting some threshold, without caring which specific subset confirms delivery.

Confirming message delivery to a threshold of participants is the basic purpose of a threshold witnessing protocol. Threshold witnessing is useful, for example, in proactively ensuring the public transparency of software updates or building scalable cryptographically-trackable blockchains.

Threshold witnessing may be secured against Byzantine behavior using cryptographic multisignature or threshold signing schemes. Since we are assuming no Byzantine nodes for now, however, simple acknowledgments suffice for the moment in TLC.

We introduce a new witness threshold configuration parameter $t_w$ to TLC. A TLC protocol instance is thus now parameterized by message threshold $t_m$, witness threshold $t_w$, and total number of nodes n. We will label such a TLC configuration TLC($t_m$; $t_w$; n) for brevity. In practice we will typically pick $t_w$ either to be equal to $t_m$, or to be zero, reducing to unwitnessed TLC as described above.

We separate the message and witness thresholds, however, because they play orthogonal but complementary roles.

These threshold parameters establish a two-part condition for a node to advance logical time. To get from step s to s+1, each node must collect not just $t_m$ messages but $t_m$ threshold witnessed messages from step s. Each threshold message must have been witnessed by at least $t_w$ participants before it can "count" towards $t_m$.

To create a threshold witnessed message, each node i first broadcasts its "bare" unwitnessed step s message m, and begins collecting witness acknowledgments on m from participants serving as witnesses. Another node j that receives m in step s simply replies with an acknowledgment that it has witnessed m. Upon collecting a $t_w$ threshold of witness acknowledgments within step s, node i broadcasts an assertion that m has been threshold witnessed.

Figure 2:
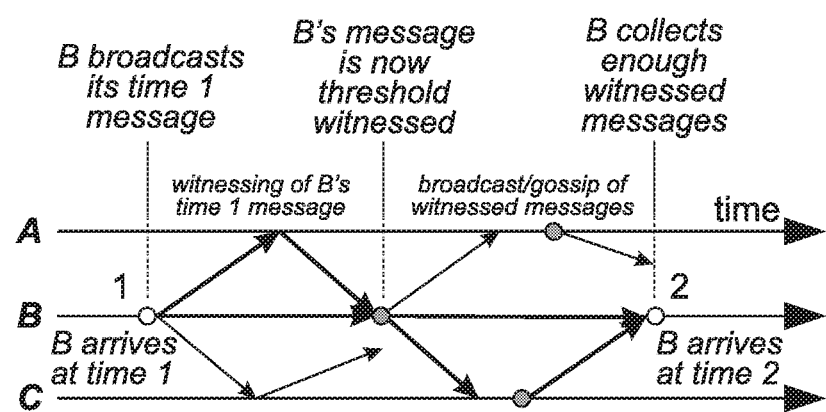
FIG. 2 illustrates a witnessed method to stitch form one time-step to the next, from the perspective of one particular node B. Darker arrows indicate messages on the "critical path" enabling node B to make progress.

Only upon receiving this threshold witness confirmation may any node count m towards its message thresh old $t_m$ required to advance to step s+1. FIG. 2 illustrates this process in a simple 3-node configuration.

Suppose a node i broadcasts an unwitnessed message m for step s, and another node j receives m not in step s, but after having advanced to a later step s'>s. In this case, receiving node j considers m to be "too late" for step s, and declines to witness m for step s. Instead, j replies with the information i needs to "catch up" to the most recent steps' that j is aware of. If too many nodes receive i's message rn too late, this may make it impossible for m ever to be threshold witnessed—but i can still advance its logical time with the information j provided in lieu of a witness acknowledgment for step s.

Due to network scheduling, a node i may receive $t_m$ threshold witnessed messages of other nodes, and hence satisfy the conditions to advance time, before i has obtained a threshold $t_w$ of witness acknowledgments to its own step s message. In this case, i simply abandons its collection of witness acknowledgments for its own message and moves on, using only other nodes' threshold witnessed messages and not its own as its basis for advancing time. This rule preserves the property that time advancement advances virally, as discussed above, and ensures that a lagging node can "catch up" instantly to the rest upon receiving a message from a recent time-step.

With witnessed TLC, we now have a convenient basis for reasoning about information flow both into and out of a node at a given time-step. As before, we know that to reach step s+1 any node i must have collected information—and hence be "caught up" on the histories of—at least $t_m$ nodes as of step s. With witnessed TLC, we additionally know by construction that any node's step s message that is threshold witnessed by step s+1 has propagated "out" to and been seen by at least $t_w$ nodes by s+1. Finally, because only threshold witnessed messages count towards the $t_m$ threshold to advance time, we know that by the time any node reaches step s+1 there are at least $t_n$ threshold witnessed messages from step s.

4.6 Majoritarian Reasoning with TLC

So far we have developed TLC in terms of arbitrary thresholds $t_m$ and $t_w$ without regard to any specific choice of thresholds. But many interesting protocols, such as consensus protocols, rely on majoritarian logic: i.e., that a participant has received information from, or successfully delivered information to, a majority of participants.

For this reason, we now explore the important special case of TLC configured with majority thresholds: i.e., $t_m$>n=2 and $t_w$>n=2. To tolerate Byzantine faults, Section 7 will adjust these thresholds to ensure majorities of correct, non-Byzantine nodes but the fundamental principles remain the same.

Configured with majority thresholds, TLC offers two key useful properties: time period delineation and twostep broadcast. We develop these properties next.

4.7 Global Time Period Delineation

Figure 3:
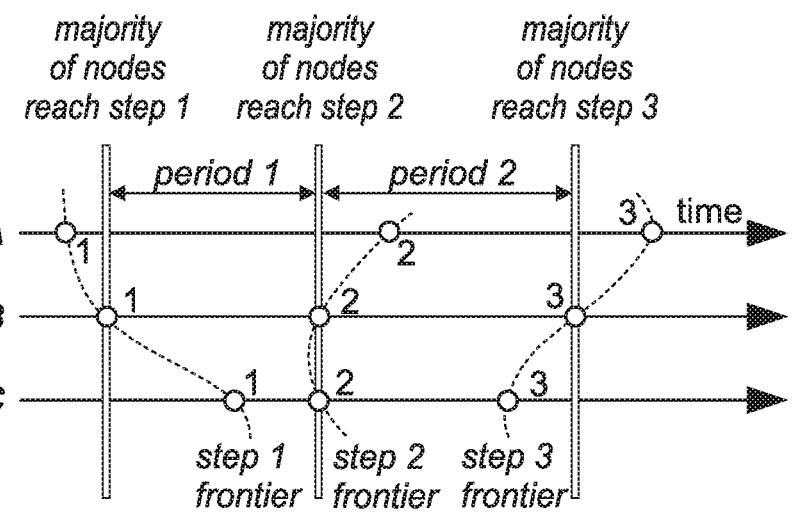
FIG. 3 illustrates global (virtual) time periods demarked by the moments a majority of correct nodes reach a threshold time t.

Even though different TLC nodes reach a given time step at varying real times, majoritarian TLC nevertheless divides not just logical but also real wall-clock time into a well-defined quasi-synchronous succession of real time periods. The start of each global time period may be defined by the moment in real time that a majority of nodes first reaches a given logical time step s. FIG. 3 illustrates this principle, with real time delineated into successive time periods, each starting the moment the first two of the three nodes have advanced to a given time step.

Because each node's logical clock advances monotonically, and a majority of nodes must reach step s before a majority of nodes can reach s+1, these majoritarian time periods likewise advance monotonically. These time periods in principle create the effect of a purely synchronous "lockstep" system, but with time periods "self-timed" by the progress of underlying network communication.

Even though these majoritarian time periods are easy to define in principle, we face a practical challenge in protocol design. Without precisely-calibrated real-time clocks, which we prefer not to assume, an individual node will rarely be able to tell whether it has advanced to logical time step s before, or after, other participants. This implies in turn that no node can realistically be expected to know or determine precisely when a previous time period ends and the next begins. In the FIG. 3 example, although globally there is a clear and well-defined "fact of the matter" regarding the moment each majoritarian time period begins and ends, a node will be unable to tell whether it advanced to step s before majoritarian time period s started (e.g., 1A), after period s started (1C), or happened to be the "critical moment" that launched period s (1B).

Despite this limitation in the knowledge of any given node, this majoritarian delineation of real time into periods gives us important tools for reasoning conservatively about when any particular message could, or could not, have been formulated and sent. Consider in particular a given time period s, starting the moment a majority of participants reach step s and ending the moment a majority of participants reach s+1. We can be sure that:

1. No node can advance to step s+1, or send a message labeled s+1, before the prior global time period s has started, Such a node i would have had to collect a majority $t_m$ of step s messages to meet its condition to advance logical time, but no majority of step s messages can be available to i before a majority of nodes has actually reached step s.
2. After global time period s has ended and s+1 begun, no node can formulate or successfully threshold witness any new message for step s. Getting a step s message threshold witnessed would require a majority of nodes to provide witness acknowledgments for step s. But after period s+1 begins, a majority of nodes has "moved on" to s+1 and stopped providing witness acknowledgments for step s, leaving only an inadequate minority of nodes that could potentially witness new messages for step s.

Looking at an illustration like FIG. 3, one might reasonably ask whether the wandering time frontiers, representing each node's advancement to a given step s, can "cross" over not only the majoritarian time period s boundary, but also the time period boundaries before (s⌐1) and/or after (s+1). The above two guarantees in a sense answer this question in the negative, effectively keeping all nodes approximately synchronized with each other, plus or minus at most one logical time step.

The first property above trivially ensures that no node can reach step 2 before global time period 1 has begun, can reach step 3 before period 2 has begun, etc. Thus, no node can "race ahead" of the majority's notion of the current logical time by more than one time step.

And although communication patterns such as denialof-service attacks could cause a particular node to "lag" many time-steps behind the majority in terms of real time, the second property above guarantees that such a lagging node cannot actually produce any effect, observable via threshold witnessed messages, after period s has ended and s+1 begun. Any new messages the lagging node might produce after period s+1 has begun will effectively be "censored", by virtue of being unable ever to be threshold witnessed. The lagging node will once again be able to send threshold witnessed messages when, and only when, it "catches up" to the current global time period.

4.8 Two-Step Semi-Reliable Broadcast

Another key property we obtain from majority message and witness thresholds is a guarantee that a majority of the messages sent at any time step s will be known to all participants by step s+2. TLC thus implicitly provides two-step broadcast at least for a majority, though not all, of the messages sent at any time step. To see why this is the case, consider that in order for any node to advance to step s+1, it must collect a majority $t_m$ of threshold witnessed messages from step s. Each of these messages must have been seen by a majority $t_w$ of nodes in order to have been successfully threshold witnessed. To reach step s+2, in turn, each node must collect a majority $t_m$ of threshold witnessed messages from step s+1. The majority of nodes that witnessed any threshold witnessed message m from step s must overlap, by at least one node i, with the majority of nodes that any other node j collects messages from in order to reach s+2, This intersection node i effectively serves as a conduit through which j is guaranteed to learn of message m transitively through causal knowledge propagation, even if j itself did not directly witness m during step s.

Since the real time at which nodes reach step s+2 is determined by the network's arbitrary communication schedule, this two-step broadcast property can make no guarantees about when in real time any node actually learns about threshold witnessed message m. A minority of nodes might lag many time steps behind the majority, and learn about m only when they eventually "catch up" and resynchronize. By the time period delineation properties above, however, no lagging node will be able to have any effect on the majority, observable through threshold witnessed messages, before catching up with the majority. If the lagging node catches up at step s+2 or later, it learns about threshold witnessed message m from step s, through causal propagation, in the process of catching up.

It is important to keep in mind that this two-step broadcast property applies only to the "lucky" majority of messages that were threshold witnessed in step s, however. A minority of messages that other participants tried to send in step s may never be threshold witnessed before too many nodes advance to s+1 and the "gate closes" on step s. These unlucky step s messages might be seen by some participants, but TLC can make no guarantee that all, or any particular number, of participants will ever see them. Further, the adversarial network gets to decide which messages are in the lucky majority that are threshold witnessed and broadcast, and which are unlucky and potentially lost to history. Messages that fail to achieve threshold witnessed status during a time step may be considered casualties of network asynchrony.

Another subtle but important caveat with two-step broadcast in TLC is that even if message m is threshold witnessed in step s and broadcast to all nodes by s+2, this does not mean that all nodes will know that m was threshold witnessed by s+2. Suppose a node i receives and acknowledges the bare, unwitnessed version of m during step s, for example, thereby contributing to the eventual threshold witnessing of m. Node i might then, however, advance to steps s+1 and s+2 on the basis of other sets of threshold witnessed messages not including m, without ever learning that m was fully threshold witnessed. In this case, while i has indeed, like all nodes, seen at least a bare unwitnessed version of m by step s+2, only some nodes may know by s+2 that m was successfully threshold witnessed. This subtlety will become important later in Section 6.5 as we build consensus protocols atop TLC.

5 Building Basic Services on TLC

Before we tackle asynchronous consensus in Section 6, we first briefly sketch several classic distributed services not requiring consensus that are easy and natural to build using TLC for pacing. While these services may be built without TLC, the threshold logical clock abstraction makes it simple for such distributed services to operate atop fully asynchronous networks in self-timed fashion as quickly as network communication permits.

5.1 Network Time Services

Even in asynchronous distributed systems that we do not wish to be driven by wall-clock time or timeouts, it is still important in many ways to be able to tell time and interact properly with the wall clock. We first discuss three basic time-centric services and how they might benefit from asynchronous operation atop TLC: clock synchronization, trusted timestamping, and encrypted time capsules.

5.1.1 Clock Initialization and Synchronization

Time services such as NTP, by which networked devices around the world synchronize their clocks, play a fundamental role in the Internet's architecture. Without time services, all devices' real-time clocks gradually drift, and can become wildly inaccurate after power or clock failures, Drifting or inaccurate device clocks can undermine the functioning of real-time systems and wireless sensor networks. Security protocols often rely on devices having roughly-synchronized clocks, otherwise becoming vulnerable to attacks such as the replay of expired credentials, certificates, or outdated software with known exploits.

While a correct sense of time is critical to the reliability and security of today's networked devices, numerous weaknesses have been found in traditional time services. The fact that clients typically rely entirely on a single NTP time server (e.g., the nearest found on a list) is itself an inherent single-point-of-failure weakness. Using GPS as a time source, while ubiquitous and accurate under normal conditions, is less trustworthy as GPS spoofing proliferates. A networked device might achieve a more secure notion of the time by relying on a group of independent time servers rather than just one, thereby avoiding any single point of failure or compromise.

TLC represents a natural substrate atop which to build such a distributed time service or beacon. One approach is for each server in a TLC coordination group to publish a log (or "blockchain") of current-time records, one per TLC time-step. Each successive record indicates the server's notion of the record's publication time, ideally measured from a local high-precision source such as an atomic dock, Each published record is both digitally signed by the server, and witness cosigned by other coordination group members, thereby attesting to clients jointly that the server's notion of time is consistent to some tolerance. Clients may still follow just one time server at a time as they currently do (e.g., the closest one), but protect themselves from major inaccuracy or compromise of their time source by verifying the witness cosignatures as well. We address later in Section 9.3 the important detail of allowing witnesses to validate proposed time records in an asynchronous setting without introducing arbitrary timeouts or tolerance windows.

The precision a distributed time beacon can provide will naturally depend on factors such as how widely distributed the participating servers are and how reliable and predictable their mutual connectivity is. Building a distributed time beacon atop TLC offers the potential key benefit of adapting automatically to group configurations and network conditions. A time beacon composed of globally-distributed servers could offer maximum independence and diversity, and hence security, at the cost of limited precision due to the hundreds-of milliseconds round-trip delays between group members. Such a widely-distributed service could offer client devices a coarse-grained but highly-secure "backstop" reference clock ensuring that the device's clock cannot be off by minutes or hours even if more-precise time sources are unavailable or subverted. Another complementary time beacon running the same TLC-based protocol, but composed of servers colocated in a single city or data center with a low-latency interconnect, would automatically generate much more frequent, high-precision time reports, while still avoiding single points of failure and degrading gracefully during partial failures or attacks.

5.1.2 Trusted Timestamping and Notarization

A closely-related application is a digital timestamping service, which not only tells the current time, but also produces timestamps on demand attesting that some data known to the client existed at a certain time. Standards such as the Time-Stamp Protocol allow clients to request a signed timestamp on cryptographically hashed data from a trusted timestamping authority. Such an authority is again a single point of failure, however, motivating recently-popular decentralized approaches to timestamping, such as collecting content hashes into a Merkle tree and embedding its root in a Bitcoin transaction, or collectively signing each root.

An asynchronous distributed timestamping service, whose period and tirnestarnp granularity is self-timed to the best allowed by group configuration and prevailing network conditions, represents a natural extension to a TLC-based time service. Each server in such a group might independently collect client-submitted content hashes into Merkle trees, publishing a signed and witness cosigned tree each TLC time step, as in the CoSi time service. In addition, a newly-started or long-offline device can bootstrap its internal clock with strong freshness protection, preventing an upstream net-work attacker from back-dating its notion of time, by initializing its clock according to a witness cosigned timestamp it requests on a freshly-generated random nonce.

5.1.3 Encrypted Time Capsules

A third classic time-related service with many potential uses is a cryptographic time vault or time capsule, allowing clients to encrypt data so that it will become decryptable at a designated future time. In games, auctions, and many other market systems, for example, participants often wish to encrypt their moves or bids from others until a designated closing time to guard against front running. Time-lock puzzles and verifiable delay functions represent purely cryptographic proposals to achieve this goal, but cryptographic approaches face inherent challenges in accurately estimating the future evolution of, and market investment in, computational and cryptanalytic puzzle-solving power.

Another approach to time capsules more compatible with TLC relies on a time service that holds a master key for identity-based encryption (IBE). Clients encrypt their messages to a virtual "identity" representing a particular future time. The time service regularly generates and publishes the BE private keys representing these "time identities" as they pass, allowing anyone to decrypt any time-locked ciphertext after the designated time passes. Threshold secret-sharing the BE master key among the group avoids single points of failure or compromise. The asynchronous setting presents the challenge that clients seemingly must predict the future rate at which the time capsule service will operate, and hence the granularity at which it will publish time identity keys, a detail we address later in Section 9.3.

5.2 Public Randomness Beacons

Like time, trustworthy public randomness has become an essential "utility" needed by numerous applications, Lotteries and games need random choices that all participants can trust to be fair and unbiased, despite the many times such trust has been breached in the past. Governments need public randomness to choose a sample of ballots to select jury candidates, to audit election results, and experimentally, to involve citizens in policy deliberation through sortition. Large-scale decentralized systems such as blockchains need public randomness to "scale out" via sharding.

The many uses for public randomness have inspired beacons such as NIST's, Concerns about centralized beacons being a single point of compromise, however, again motivate more decentralized approaches to public randomness. Threshold-secure approaches are naturally suited to being built on TLC, which can pace the beacon to produce fresh random outputs dynamically as often as network connectivity permits, rather than at a fixed period.

6 Que Sera Consensus (QSC)

We now explore approaches to build consensus protocols atop TLC, using a series of strawman examples to address the key challenges in a step-by-step fashion for clarity. This series of refinements will lead us to Q S C3, a randomized non-Byzantine (i.e., Paxos-equivalent) consensus protocol. We leave Byzantine consensus to Section 7.

A desire to clarify this reasoning motivates our extended, step-by-step exposition. Expert readers may feel free to skip to the final solution summarized in Section 6.10 if desired.

6.1 Strawman 0

As a starting point, we will not even try to achieve consensus reliably on a single common history, but instead simply allow each node to define and build its own idea of a possible history, independently of all other nodes. For convenience and familiarity, we will represent each node's possible history as a blockchain, or tamper-evident log in the form popularized by Bitcoin.

At TLC time-step 0, we assume all N nodes start building from a common genesis block that was somehow agreed upon manually. At each subsequent time-step, each node independently formulates and proposes a new block, which contains a cryptographic hash or back-link to the previous block. Thus, node i's block 1 contains a hash of the genesis block, node i's block 2 contains a hash of node i's block 1, and so on. The main useful property of this structure is that the blockchain's entire history is identified and committed by knowledge of the head, or most recent block added. It is cryptographically infeasible to modify any part of history without scrambling all the hash-links in all subsequent blocks including the head, thereby making any modification readily detectable.

Figure 4:
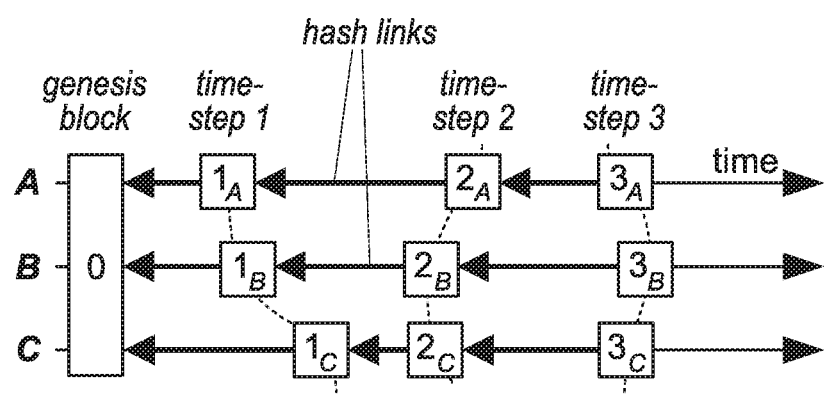
FIG. 4 illustrates the Strawman 0: embodiment, in which each of the N nodes A, B, C independently builds its own possible history, each represented by a blockchain with one block per time-step.

FIG. 4 illustrates three nodes building three independent blockchains in this way. The real (wall-clock) time at which each node reaches a given TLC time-step and proposes the corresponding block on its blockchain may vary widely across nodes due to network delays, but TLC serves to pace all nodes' advancement of time and keep them logically in lock-step despite these delays.

If we assume each node's proposed block at a given time-step contains a set of transactions submitted by clients, as in Bitcoin, then even this strawman protocol can provide a limited notion of "consensus." If a client submits some transaction T to all N nodes (e.g., "Alice pays Bob 1 BTC"), and the client succeeds in getting T embedded in each node's history, then the client can consider T to be "committed." This is because regardless of which of the N possible histories we might choose to believe, all of them contain and account for transaction T.

However, if a "double-spending" client manages to get T onto some nodes' blockchains and gets a conflicting transaction T'≠T onto others (e.g., Alice pays Charlie the same 1 BTC), then we will forever be uncertain whether Bob or Charlie now holds the 1 BTC and unable ever to resolve the situation, Thus, we need a way to break the symmetry and enable some competing histories to "win" and others "lose"—the challenge we tackle next.

6.2 Strawman 1

Introducing randomness makes it surprisingly simple to create a working, if non-ideal, consensus protocol. Suppose we modify the above strawman such that at each time-step, one randomly-chosen node chooses to adopt and build on the blockchain of a randomly-chosen neighbor instead of its own. This node's prior history is thus dropped from the space of possibilities, and effectively replaced with the node's newly-adopted view of history.

Figure 5:
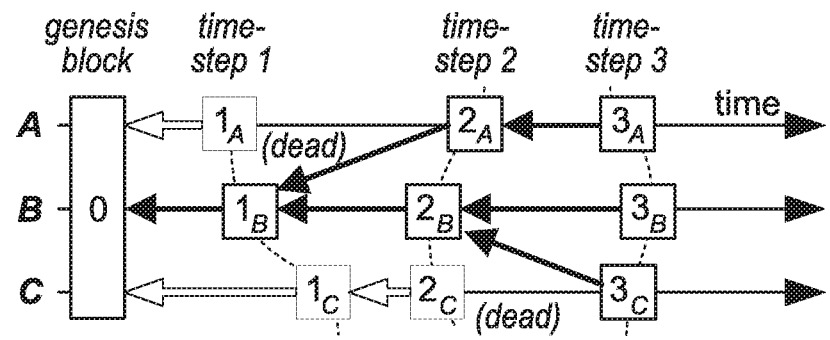
FIG. 5 illustrates the Strawman 1 embodiment, in which each of the N nodes A, B, C occasionally choose to adopt a random neighbor's blockchain in favor of their own, as if one history "genome" had "died" while another "reproduced."

Consider the example in FIG. 5. At TLC step 1, each node independently builds on the genesis block as before. At step 2, however, node A randomly chooses to build on B's prior blockchain instead of its own. Similarly, at step 3, node C chooses to adopt B's blockchain. While we still have three competing heads and hence FIG. 5: Illustration of Strawman 1, in which each of the N nodes occasionally choose to adopt a random neighbor's blockchain in favor of their own, as if one history "genome" had "died" while another "reproduced." competing histories (namely 3A, 3B, and 3C), nevertheless they happen to share a common prefix, namely block 1B, Because all future time-steps must build on one of these three possible histories, all sharing this common prefix, we can consider the common prefix (block 1B) to be committed—even if we can't (yet) say anything about the more recent blocks. This situation is directly analogous to the common event of a temporary fork in Bitcoin, where two miners mine competing blocks at about the same time, deferring resolution of the conflict for later. The main difference is that we pace the "mining" of blocks in our protocol using TLC instead of via proof-of-work.

Whenever one node adopts another's blockchain, any transactions that had existed only in the node's prior blockchain become lost or in effect "aborted." All transactions on the adopted blockchain, in contrast, become more likely to survive long-term because they are represented redundantly in the (new) history of one additional node, and become correspondingly more likely to propagate further via future adoption events. If we ever happen to observe that through this random history-adoption process, a particular transaction of interest has propagated to all N nodes' view of history, then we can consider that transaction to be definitely "committed." But will every transaction reach such a state of being definitely either "committed" (by virtue of being on all nodes' views of history) or "aborted" (by virtue of being on none of them)?

Given time, the answer is definitely yes. This is because from the perspective of a particular transaction that any node first introduces in a block on its local blockchain, that transaction's subsequent propagation or elimination corresponds to a Moran process, a statistical process designed to model genetic drift in a population constrained to a fixed size (e.g, by natural resource limits). A node's adoption of another's blockchain corresponds to the successful "reproduction" of the adopted blockchain, coincident with the "death" of the replaced blockchain. We might view all the transactions in the adopted blockchain's view of history to be the "genome" of the successfully-reproducing blockchain, whose constituent blocks and transactions become more likely to survive with each successful reproduction.

This process is a variation on the Pólya urn model, where we view each competing blockchain (or the transactions on them) as colored balls in an urn. From this perspective, we view one node's adoption of another's blockchain as the removal of a pair of colored balls from the urn, where we duplicate one, discard the other, and return the two duplicates to the urn. With time, this process guarantees that any particular transaction in any particular blockchain's "genome" is eventually either lost (aborted) or propagated to all other individuals (committed). If all nodes' blockchains have the same "genetic fitness" or likeliness to reproduce, then a transaction first introduced in a block on any one node has a uniform probability of 1=N of eventually being "committed" this way.

This strawman has several limitations. 1=N is not a great probability of a proposed transaction being successfully committed. We must wait a considerable time before we can know a transaction's commit/abort status for certain. And we must monitor all nodes' blockchains—not just a threshold number of them in order to reach absolute certainty of this commit/abort status. However, this strawman does illustrate how to achieve some notion of "consensus" through a random process.

6.3 Strawman 2

We can speed up the above "genetic process" in two ways, which we do now. First, we can simply increase the global rate of death and reproduction, by requiring several even all—nodes to replace their history at each time-step with a randomly-chosen node's prior history. TLC's lock-step notion of logical time facilitates this process. At each step s each node proposes and announces a new block, then at s+1 each node chooses any node's step s block at random to build on in its step s+1's proposal. Thus, each node's proposal will survive even just one round only if some node (any node) happens to choose it to build on.

The second, more powerful way we can accelerate the process—and even achieve "near-instant" genetic consensus—is by using randomness also to break the symmetry of each proposal's "genetic fitness" or likeliness to reproduce. At each TLC time-step s, each node announces not only its newly-proposed block, but also chooses and attaches to its proposal a random numeric lottery ticket, which will represent the proposal's "genetic fitness" relative to others. These lottery tickets may be chosen from essentially any distribution, provided all nodes correctly choose them at random from the same distribution: e.g., real numbers between 0 and 1 will work fine.

By TLC's progress rules, each node must have collected a threshold number of proposals from step s as its condition to progress to step s+1. Instead of picking an arbitrary one of these proposals to build on in the next consensus round starting at s+1, each node i must now choose the step s proposal with the highest-numbered lottery ticket that i knows about: i.e., the most "genetically fit" or "attractive" proposal it sees. Step s proposals with higher fitness will be much more likely to "survive" and be built upon in subsequent rounds, while proposals with lower fitness usually disappear immediately because no one chooses to build on them in subsequent rounds.

Figure 6:
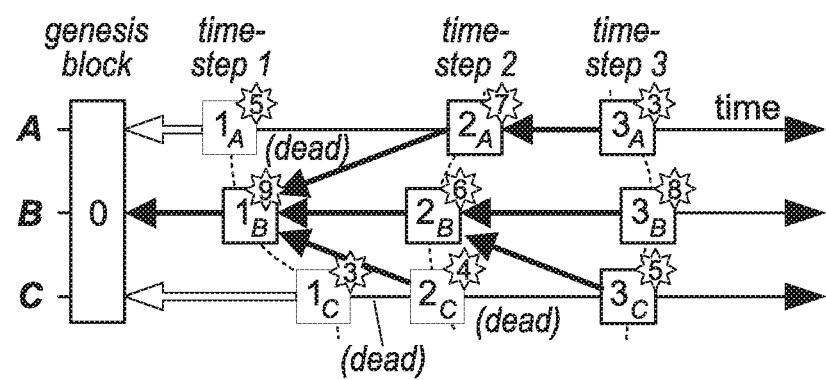

FIG. 6 illustrates this process. At step 2, all three nodes see and thus choose node B's "maximally fit" proposal from step 1 to adopt and build on, thereby achieving instant commitment globally. At step 3, however, nodes B and C choose the second-most-fit proposal by B, because A's globally-winning proposal was unfortunately not among those that B or C collected in progressing to TLC step 3. With global knowledge, at step 3 we can be certain that all transactions up through block 1B are committed, but we remain uncertain whether blocks 2A or 2B will eventually win since both still survive at step 3.

If all nodes correctly follow this process, then we reduce the number of possible blockchains effectively surviving and emerging from any time period from n down to f+1. This is because when any node i reaches step s+1, there are at most f proposals it might have missed seeing upon meeting the threshold condition to reach s+1, and hence at most f proposals might have had a better fitness than the best proposal i saw and picked.

6.4 Strawman 3

While we have accelerated genetic consensus and reduced the number of possible histories that can survive at each step, we still face the problem that no one can be certain whether consensus has actually been achieved without seeing all nodes' choices at each time-step. If any node, or one of their clients, tried to collect this information globally, it might hang waiting to hear from one last long-delayed or failed node, defeating the high availability goal of threshold coordination. It thus appears we can never discern consensus with certainty.

In FIG. 6, for example, node B may be unable to distinguish between the "consensus" situation at step 2 and the "lack of consensus" situation at step 3, if B has seen only C's step 2 decision and not A's upon reaching step 3. B cannot just wait to hear from A as well without compromising availability, but B also cannot exclude the risk that a higher-fitness "minority opinion" such as block 2A might exist and eventually win over those B knew about.

This "minority report" problem suggests an appealing solution: let us restrict the genetic competition at each step only to celebrity proposals, or those that a majority of nodes have heard of by the next time-step when it is time to pick winners. By having each node choose the most fit only among celebrity proposals, we hope to prevent an unknown, high-fitness, "dark horse" from later "spoiling" what might appear to be consensus. This attempt will fail, but in a useful way that moves us toward a solution.

TLC's threshold witnessing and certification process in each round conveniently provides the information we need to identify celebrity proposals. Since each participant needs to collect a threshold number of threshold witnessed messages from step s anyway as its condition for transitioning to step s+1, we simply impose the new rule that each participant chooses the one of these threshold witnessed proposals with the highest-numbered lottery ticket as the "preferred" step s proposal to build on at step s+1. Step s proposals not in node is threshold witnessed set—i.e., the at most f proposals that i did not wait to be certified before i moved to s+1—are thus not eligible from i's perspective to build on at s+1.

With this added rule, each proposal from step s that survives to be built on at s+1, is, by protocol construction, a proposal that most of the participants (all but at most f) have seen by step s+1. Intuitively, this should increase the chance that "most" nodes at s+1 will choose and build on the same "lottery winner" from time s. This rule still leaves uncertainty, however, since different participants might have seen different subsets of certified proposals from time s, and not all of them might have seen the eligible proposal with the globally winning ticket.

6.5 Strawman 4

To address this lingering challenge, it would seem useful if we could be certain that not just a majority of nodes, but al nodes, know about any proposal we might see as a candidate for achieving consensus. Further refining the above celebrity approach, in fact, we can ensure that celebrity proposals known to a majority of nodes reach universal celebrity status—becoming universally known to all participants—simply by "biding our time" for a second TLC time-step during each consensus round.

Recall from Section 4.8 that with majority thresholds, any message m that is broadcast at time-step s and is threshold-witnessed by step s+1 will have propagated to all nodes by step s+2. This is because the set S of nodes that witnessed m by step s+1 must overlap by at least one node with the set S' of nodes whose step s+1 messages any node must collect in order to reach step s+2.

Motivated by this observation, we now modify the consensus process so that each round requires two TLC timesteps instead of one. That is, each consensus round r will start at step s=2r, and will finish at step s+2, the same logical time that consensus round r+1 starts.

At step s, each node proposes a block as before, but waits until step s+2 to choose a step s proposal to build on in the next consensus round. Because the universal broadcast property above holds only for messages that were witnessed by a majority of nodes by step s+1, we must still restrict each node's choice of proposals at step s+2 to those that had achieved majority celebrity status by step s+1. Among these, each node as usual chooses the eligible proposal from step s with the highest lottery ticket.

Figure 7:
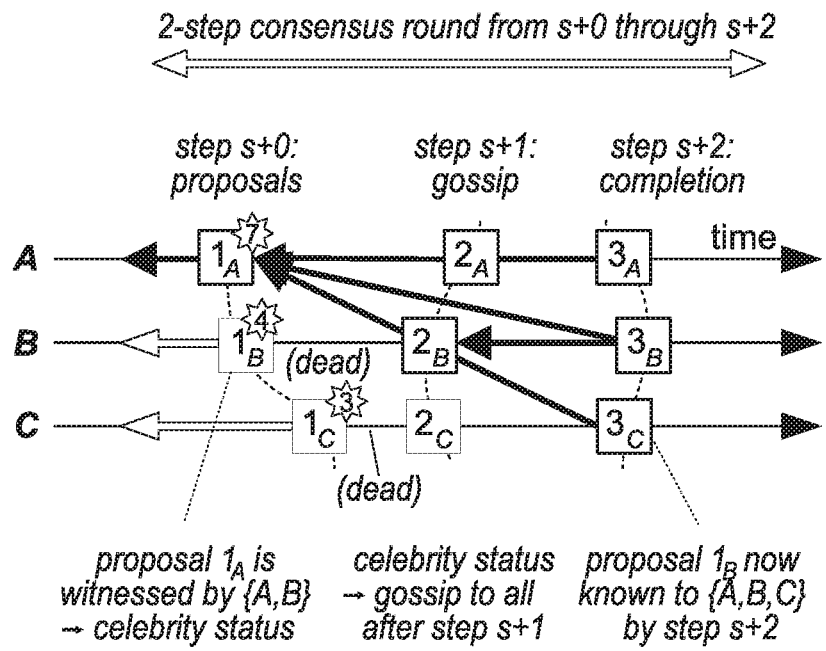
FIG. 7 illustrates the Strawman 4 embodiment, in which knowledge of winning proposal $1_A$ propagates to all nodes in two steps after being threshold witnessed by step s+1.

By slowing down consensus, we ensure the promising property that whichever step s proposal p a node might choose for the next round at s+2, all nodes know about proposal p by step s+2. FIG. 7 illustrates this process in a scenario in which A's proposal at step s+0 is threshold witnessed by nodes {A;B} by step s+1 to achieve celebrity status, then as a result propagates to all nodes {A;B;C} by s+2.

Are we done? Unfortunately not. As discussed earlier in Section 4.8, the fact that all nodes know the existence of p by step s+2 does not imply that all nodes will know the crucial fact that p was threshold witnessed and thus had achieved celebrity status by s+1.

Due to message timing, different nodes may reach steps s+1 and s+2 on the basis of different subsets of threshold-witnessed messages. For example, one node i might see that proposal p was threshold-witnessed by step s+1, and eventually choose it as the best eligible proposal by s+2. Another node j, in contrast, might have reached step s+1 on the basis of a different set of witnessed messages than i used. If proposal p isn't in j's threshold witnessed set by s+1, j cannot "wait around" to see if p eventually becomes fully threshold-witnessed without compromising j's availability, so j must move on.

Figure 8:
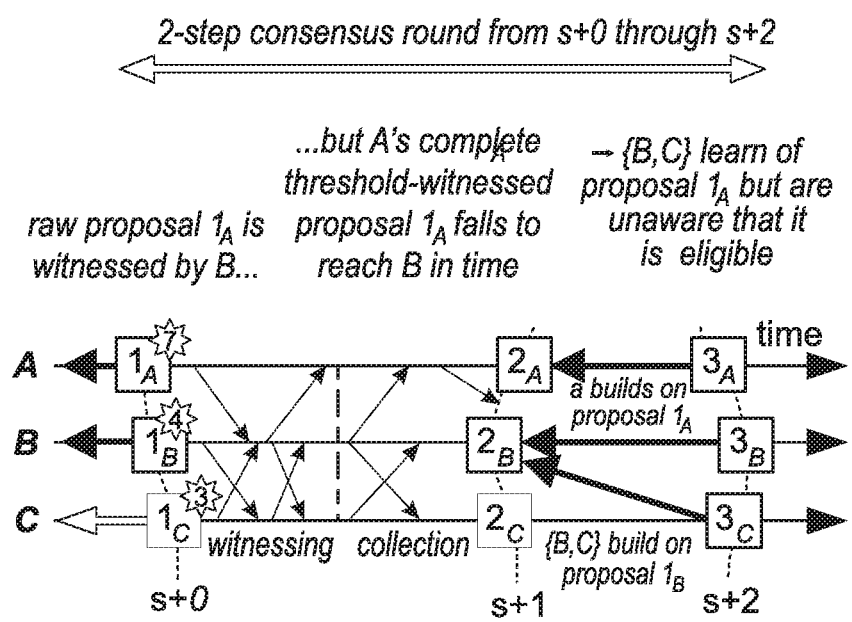
FIG. 8 illustrates a Strawman 4's failure mode, where knowledge of proposal $1_A$ propagates to all nodes by s+2 but only node A learns that $1_A$ was threshold witnessed.

In this case, j will definitely learn the existence of proposal p by step s+2, from at least one of the majority set of nodes that witnessed p by s+1. But this fact tells j only that at least one node witnessed p, not that a majority of nodes witnessed p by s+1, as required for j to consider p eligible for the next round to build on. In this situation, nodes i and j may pick different eligible proposals to build on in the next round, and neither i nor j has any readily-apparent way to distinguish this consensus failure situation from one in which all nodes fortuitously do choose the same best eligible proposal. FIG. 8 illustrates such a failure case, where the globally best proposal 1A is threshold witnessed by s+1 but only node A learns by then that proposal 1A is eligible.

6.6 Strawman 5

Is there some way a node can tell not only that a proposal p has reached celebrity status by s+1 and thus that p's existence will be known to all nodes by s+2, but additionally that the fact of p's celebrity status will also become known to all nodes? We can, by a second application of the same two-step broadcast principle, merely shifted one time-step later. Suppose some node observes p's celebrity status at step s+1, then successfully "gossips" that fact to a majority of nodes by s+2. Then not only the existence of p but also the fact of its celebrity status will subsequently become known to all nodes by s+3.

We therefore extend each consensus round to take three TLC time-steps, so that round r starts at step s=3r and ends at s+3. In addition, we will try to strengthen the eligibility criteria for proposals to ensure that both the existence and the celebrity status of any chosen proposal becomes known to all nodes by s+3. In particular, for any node i to consider a proposal p broadcast at s to be eligible for the consensus round's genetic lottery, i must see that: (a) some node j, who we'll call the paparazzi, observed and reported p's celebrity status in j's broadcast at step s+1; and (b) that j's broadcast at s+1 was in turn threshold witnessed by a majority of nodes by step s+2.

Figure 9:
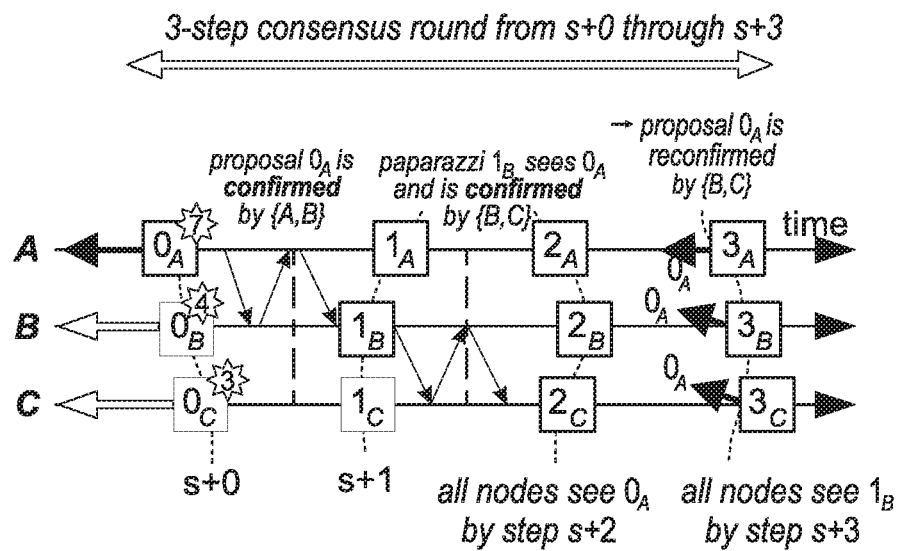
FIG. 9 illustrates the Strawman 5 embodiment, in which paparazzi node B confirms proposal $0_A$ at s+1, then gossips its confirmation to {B;C} by s+2 and to all nodes by s+3.

For brevity, in this scenario we will say that the paparazzi node j first confirms proposal p's celebrity status at step s+1, then i in turn confirms j's step s+1 broadcast in the same way. When such a "double-confirmation" linked by paparazzi node j occurs, we say that node i reconfirms proposal p. Node j's confirmation of p at s+1 ensures that all nodes will know the existence of p by s+2, and i's reconfirmation of p at s+2 in turn ensures that all nodes will know of j's confirmation of p by s+3. FIG. 9 illustrates this process, with node B acting as paparazzi for A's proposal 0.4 in an example 3-step consensus round.

Unfortunately, if node i reconfirms p by step s+2, this implies that all nodes will know by s+3 that p was confirmed, but it does not imply that other nodes will have reconfirmed p. If reconfirmation and not just confirmation is p's new eligibility condition, then we must account for the fact that we have moved the goalposts. By the end of the round at s+3, different nodes may still disagree on whether p was reconfirmed and hence (still) eligible for the genetic lottery, once again allowing disagreement about the consensus round's result in the end.

We could try playing the status gossip and confirmation game yet again, making triple-confirmation the proposal eligibility condition, but this approach just leads s+4 in circles. A proposal's triple-confirmed status will ensure that all nodes know by s+4 that it was double-confirmed, but will still leave disagreement on whether it was triple confirmed. We must therefore try something else: it is hard to win a game of counting to infinity.

6.7 Strawman 6

Since we would appear to need an infinite amount of time to get "complete" information about a consensus round, let us instead make the best we can of incomplete information. We will therefore return to using only (single) confirmation as the eligibility criterion for a proposal to enter the genetic lottery. We will then use (double) reconfirmation to give us an unreliable "crystal ball" that sometimes—when we're lucky—enables some nodes to predict when all other nodes will just happen to converge and agree on the same "best eligible proposal" during the round.

Our crystal ball will sometimes be clear, allowing a precise prediction, and sometimes cloudy, offering no useful information. Further, the crystal ball may appear clear from the perspective of some nodes, and cloudy to others, even in the same consensus round. The crystal ball's subjective fickleness may therefore leave only some nodes aware when consensus succeeds, while other nodes must wait until future rounds to learn this fact in retrospect.

Since all nodes are again using (single) confirmation as their criterion for a proposal p's eligibility, this implies that no node will choose p in this round unless at least the existence of proposal p (though not necessarily its celebrity status) has become known to all nodes by step s+2. Now suppose that some node i happens to notice that p is not just confirmed but is in fact reconfirmed (double-confirmed) by step s+2. This does not tell i that other nodes will also reconfirm p, but it does tell that all other nodes will have at least (singly) confirmed p by step s+3. Thus, node i knows—even if other nodes don't—that all nodes will realize by s+3 that p is eligible.

Finally, suppose that by step s+3, node i is also not aware of the existence of any other proposal p', confirmed or not, having a lottery ticket competitive with that of p (i.e., a value greater than or equal to p's ticket). Since any such competitive proposal p' cannot become eligible, or confirmed by any node, without p's existence at least becoming known to all nodes by s+2, the fact that i has not seen any sign of a competitive proposal implies that there can be no eligible competitor to p. There could be proposal p' with a competitive ticket value that i didn't see, but to be "hidden" from in this fashion, p' must have been seen by only a minority of nodes, and thus cannot be eligible and cannot be confirmed by anyone.

Since i now knows from p's reconfirmation that all nodes will know and have confirmed p by s+3, and no other eligible proposal competitive with p exists that any node could confirm to spoil p's victory, this means that i has successfully "gazed into the crystal ball" and predicted this round's inevitable convergence on p. Node i can predict with certainty that all nodes will choose p as their best eligible proposal to build in the next round, even though these other nodes themselves may not be aware of this convergence. Since all future histories must now build on p, i can consider all transactions in p and all prior blocks that p built on to be permanently committed.

Since other nodes may not obtain the same information as i in this round, other nodes may see the crystal ball as cloudy, and be forced to assume conservatively that consensus may have failed, and that different nodes might pick different best eligible proposals. These other nodes will eventually learn, in some future round in which they successfully use the crystal ball, that p has been committed as a prefix to some longer history that has by then been built atop proposal p. The fact that only some nodes (or even no nodes) might actually know in this round that all nodes have converged on p does not change the inevitably—or "fate"—that all future history will build on p.

Some consensus rounds may also genuinely fail to converge, in which case different nodes see and choose different proposals as the best eligible. In this case, all nodes will perceive the crystal ball as cloudy. Some nodes might fail to discern the eligibility status of the best (globally) eligible proposal, instead seeing that proposal as a "spoiler" competitive with some next-best proposal that they do confirm as eligible. Other nodes might confirm the best proposal as eligible, but fail to reconfirm it because knowledge of the proposal's eligibility failed to propagate to a majority of nodes, making the proposal's reconfirmation impossible. In any case, any consensus round that fails to converge can still safely yield multiple "competing" proposals, as in earlier cases above, to be left for resolution by a more-fortunate future consensus round.

6.8 Something Wicked this Way Routes

Having resigned ourselves to the possibility that only some consensus rounds may succeed, and that only some nodes may even realize that a round succeeded, we would like to know whether and how often we can actually anticipate this desirable outcome. If the network is truly adversarial, however, choosing message delays and delivery orders intelligently to prevent consensus from succeeding, for example, then we still appear to have a problem.

If the adversary can see the lottery ticket for each proposal p as soon as p is broadcast at a consensus round's start time s+0, the adversary can arrange message delivery order so that no consensus round ever succeeds. For example, the adversary can first collect all proposals from step s along with their lottery tickets, then arrange for the proposals with the three highest-valued lottery tickets each to be witnessed by only a third the n nodes each, ensuring that none of these proposals can propagate to a majority of nodes by step s to become eligible, Any other proposal that any node might confirm as eligible will always be "spoiled" by one of the best three (always ineligible) proposals, preventing convergence and keeping all nodes' crystal balls permanently cloudy.

We could just assume that the network schedules message deliveries arbitrarily but obliviously to the values computed and used in distributed protocols, as in oblivious scheduler models. In today's open Internet, however, the threat of intelligent disruption from network adversaries is unfortunately all too realistic. Fortunately, we have a way to ensure that the adversary cannot interfere with consensus in this fashion. We simply ensure that the adversary cannot know the lottery tickets associated with each proposal un-til later, after the consensus round has completed and the adversary has already "committed" its decisions on network delays and ordering. In effect, if we force the network adversary to "play its hand" first, b y forwarding enough messages to allow the consensus round to complete before the adversary can learn any lottery ticket values, then we can ensure by design that the adversary's decisions are independent of the lottery tickets—exactly as if network ordering was arbitrary but oblivious.

How can we ensure that an adversarial network does not learn the proposals' lottery ticket values before the consensus round completes? In the present non-Byzantine case in which we assume all nodes are correct, we can rely on them not to leak information to the network adversary directly. We therefore need only to ensure that ticket values do not leak to the network adversary while in transit over the network, which we can accomplish simply by encrypting the lottery ticket values—or better yet in practice, all inter-node communication—using a standard pairwise encryption protocol such as TLS. This approach obviously fails as soon as there is even one Byzantine node that might leak the lottery ticket values to the adversary; we address this problem later in Section 7 using Shamir secret sharing. For now, however, we sim-ply assume that the lottery ticket values are kept out of the adversary's knowledge "somehow" until the consensus round is over, so that we can assume that they are independent of network delays and ordering considerations.

6.9 Calculating the Odds of Success

Given that lottery ticket values are independent of network scheduling, we can now analyze the probability that any particular node i will "get lucky" and observe a consensus round to succeed. This occurs only when all nodes converge on the same proposal p, and node i in particular is able to detect this convergence by reconfirming (double-confirming) proposal p. We focus this analysis purely on what a particular node i observes, because we merely want to ensure that each node observes success "often enough" regardless of any other node's experience.

For simplicity, we will conservatively focus our analysis on the event that i observes the globally highest numbered proposal p to commit. This situation is sufficient, but not necessary, for i to observe success. Network scheduling could cause all nodes to converge on a proposal other than the global best, and cause i to witness this as successful commitment, if any other higher-numbered proposals do not become eligible and fail to arrive at i to "spoil" its view. But this (likely rare) event can only improve i's observed success rate, so we ignore it and focus only on commitments of the globally-best proposal.

Recall the two key conditions above for i to see in its "crystal ball" that proposal p has been committed: (a) that i has reconfirmed p, and (b) that i has seen no other proposal p' from step s, confirmed or not, with a lottery ticket value competitive with p's. By our assumption that p is the globally-best proposal, (b) cannot happen since no proposal globally better than p exists. We also assume here that lottery tickets have enough entropy that the chance of a tie is negligible, but accounting for ties of known probability requires only a minor adjustment to the analysis.

We therefore care only about the probability that i reconfirms p: i.e., that some paparazzi node j confirms p at step s+1 and i subsequently confirms j's step s+1 confirmation of p. Recall that i had to collect threshold witnessed messages from a majority of nodes to reach step s+2. If any one of these nodes j has confirmed p by s+1, then i will subsequently confirm j's confirmation and hence reconfirm p. The probability that at least one of these potential paparazzi confirms p is no less than the probability that any particular one does, so we can again focus conservatively on some particular node j.

Node j, in turn, had to collect threshold-witnessed proposals from a majority of nodes in order to reach step s+1. If any one of these proposals is the proposal p with the globally highest ticket, then j will certainly confirm p at s+1. Since each of the n nodes' proposals have a 1=n chance of being the globally highest, and this is unpredictable to the network adversary, the chance of node i observing any given round to succeed is at least 1=2.

Although the probabilities that different nodes in the same round observe success are interdependent in complex ways, the probabilities of observing success across successive rounds is independent because each round uses fresh lottery tickets. The success rate any node observes therefore follows the binomial distribution across multi pie rounds. The probability that a node fails to observe a successful commitment in k consecutive time steps is less than 1=2k, diminishing exponentially ask increases.

Practical Implementation

The Que sera Consensus (QSC) method can be implemented with only 13 lines of pseudo-code, as illustrated in the following exemplary embodiment.

The QSC method relies on "lock-step" synchronous broadcast, but can run atop a threshold logical clock (TLC) algorithm to time and pace partially-reliable communication atop an underlying asynchronous network.

6.10 Summary

The QSC algorithm and method of the inventions is a process that runs on each of the n nodes forever or until the node fails.

Each iteration of the main loop implements a single consensus round, which may or may not deliver a new history h.

The QSC algorithm depends on Broadcast. Each consensus round invokes this Broadcast primitive twice, thus taking exactly two broadcast time-steps per consensus round.

Each node maintains its own view of history, denoted by h, and preferably stored in a blockchain, which increases in size by one entry per round. Each node does not build strictly on its own prior history in each round, however, but can discard its own prior history in favor of adopting one built by another node. In this way QSC's behavior is analogous to Bitcoin, in which the "longest chain" rule may cause amines to abandon its own prior chain in favor of a longer chain on a competing fork. QSC replaces Bitcoin's "longest chain" rifle with a "highest priority" rule, however.

At the start of a round, each node i chooses an arbitrary message m to propose in this round, possibly empty if i has nothing to commit. This message typically represents a transaction or block of transactions that the application running on I wishes to commit, on behalf of itself or clients it is serving.

Node i also chooses a random numeric priority r using node-private (not shared) randomness. Based on this information, node i then appends a new proposal (proposal i, m, r) to the prior round's history and broadcasts this new proposed history h' using Broadcast, which returns sets R' and B'. From the set B' of messages that TSB promises were reliably broadcast to all non-failed nodes in this first Broadcast call, node i picks any history h" (not necessarily unique) having priority at least as high as any other history in B', and broadcasts h". This second Broadcast call returns history sets B" and R" in turn. Finally, i picks from the resulting set R" any best history, i.e., any history (again not necessarily unique) with priority at least as high as any other in R", as the resulting history for this round and the initial history for the next round from node i's perspective. We define the priority of a nonempty history as the priority of the last proposal it contains. Thus, a history h=[ . . . , (proposal i,m, r)] has priority r.

---

Algorithm 1: Que Sera Consensus (QSC)

---

Input: configuration parameters n, $t_r$, $t_b$, $t_n$, where $t_r > 0$, $t_b > 0$, and $t_n = n$
Input: function parameters ChooseMessage, Deliver, RandomValue, Broadcast
Run the following concurrently on each communicating process $i \in [1, \ldots, n]$:

```
h ← []                              // consensus history is initially empty
forever                             // loop forever over consensus rounds
| m ← ChooseMessage ()              // choose some message for node i to propose
| r ← RandoroValue()                // choose proposal priority using private randomness
| h' ← ‖ [(proposal i, m, r)]       // sppend one new proposal to our view of history
| (R', B') ← Broadcast (h')         // broadcast our proposal and advance one time-step
| h" ← any best history in B'       // choose best eligible history we know of so far
| (R", B") ← Broadcast (h")         // re-broadcast the best proposal we see so far
| h ← any best history in R"        // choose our best history for next consensus round
| if h ∈ B" and h is uniquely best in R' then   // history h has no possible competition
| | Deliver (h)                     // deliver newly-committed history
| end
end
```

A history h is best in a set H if h∈H and no history h'∈H has priority strictly greater than h.

The resulting history each node arrives at in a round may be either tentative or final, Each node decides separately whether to consider its history tentative or final, and nodes may make different decisions on finality in the same round. Each node i then delivers the resulting history h to the application built atop QSC only if node i determined h to be final. If i decides that h is tentative, it simply proceeds to the next round, leaving its view of history effectively undecided until some future round eventually delivers a final history.

A node i decides that its resulting history h in a round is final if (a) h is in the set B" returned from the second broadcast, and (b) h is the uniquely best history in the set R' returned from the first broadcast.

A history h is uniquely best in a set H if h∈H and there is no other history h'6=h such that h' is also in H and has priority greater than or equal to that of h.

This pair of finality conditions is sufficient to ensure that all nodes will have chosen exactly the same resulting history h at the end of this round, as explained below—even if other nodes may not necessarily realize that they have agreed on the same history. Since all future consensus rounds must invariably build on this common history h regardless of which nodes' proposals "win" those future rounds, node i can safely consider h final and deliver it to the application, knowing that all other nodes will similarly build on h regardless of their individual finality decisions.

In summary, we have defined a randomized consensus protocol atop majority-witnessed TLC. In each consensus round r starting at TLC time step s=3r, each node i simply proposes a block with a random lottery ticket, waits three TLC time-steps, then uses the communication history that TLC records and gossips to determine the round's outcome from any node's perspective.

In particular, each node i always chooses a best confirmed proposal from round r to build on in the next round r+1. Node i confirms a proposal p sent in step s+0 if i can determine that p was threshold-witnessed by a majority of nodes by step s+1. A best confirmed proposal for i is any round r proposal i has confirmed whose lottery ticket is greater than or equal to that of any other proposal i has confirmed in this round.

In addition, node i decides that the consensus round has successfully and permanently committed proposal p if all of the following three conditions hold:

Node i obtains a step s+1 message m, from some node j, that i can confirm was threshold-witnessed by a majority of nodes by s+2;

Node j's message m at s+1 recorded that proposal p from step s+0 was threshold-witnessed by a majority of nodes by s+1; and No other step s+0 proposal p'6=p that i has become aware of by step s+2 has a lottery ticket greater than or equal to that of p.

Each node i will observe successful consensus in this fashion with a probability of at least 1=2 in each round, independently of other rounds. Any round that i sees as successful permanently commits both proposal p and any prior uncommitted blocks that p built on. Thus, the probability i has not yet finalized a unique proposal for round r by a later round r+k for k≥0 is at most 1=2k.

6.11 Optimizing Performance: Pipelining

For simplicity we have described QSC with rounds running sequentially, each round r starting at TLC time-step 3r and ending at step 3r+3. An optimization, however, is to pipeline QSC consensus rounds so that a round starts on every time-step and overlaps with other rounds. With pipelining, each consensus round r starts at step r and ends at step r+3. In this way, we can smooth the communication and computation workload on nodes at each timestep, minimize the time clients submitting transactions have to wait for the start of the next consensus round, and reduce the average time clients must wait for a transaction to commit, since commitment occurs with constant probability for each completed round and pipelining triples the rate at which rounds complete.

One apparent technical challenge with pipelining is that at the start of round r+1 (step r+1), when each node broadcasts its proposal, we might expect this proposal to include a new block in a blockchain. To produce a blockchain's tamper-evident log structure, however, each block must contain a cryptographic hash of the previous block. But the content of the previous block is not and cannot be known until the prior consensus round r ends at step r+3, which due to pipelining is two time-steps after step r+1, when we appear to need it!

The solution to this challenge is to produce complete blocks, including cryptographic back-links, not at the start of each round but at the end. At the start of round r+1 (step r+1), each node broadcasts in its proposal only the lottery ticket and the semantic content to be included in this block, e.g., a batch of raw transactions that clients have asked to commit. Only at the end of round r+1, at step r+4, do nodes actually form a complete block based on this proposal. All nodes, not just the original proposer, can independently compute the block produced by round r+1's winning proposer, deterministically based on the content of its step r+1 proposal and the block it builds on from the previous round r, which we now know because it was fully determined in step r+3.

A second-order challenge that this solution creates is that in transactional systems, the proposer of a block cannot necessarily know for sure at proposal time that all of the transactions it is proposing will still be committable by the completion of the consensus round. For example, at the start of consensus round r, a node i might propose a batch of transactions including the payment of a coin from Alice to Bob. Alice might indeed own the coin to be spent according to node i's view of the blockchain at step r—but by the end of round r, at step r+3, the coin might have already been spent in a conflicting transaction appearing in the blocks i is building on from the rounds completing at steps r+1 and r+2. The deterministic block-formation function that all nodes run at the end of each round can account for this risk simply by discarding such transactions that have become uncommittable by the time they were proposed, leaving them out of the block produced at step r+3 without blaming the block's proposer for an event it could not have forseen.

7 Tolerating Byzantine Nodes

For simplicity we have assumed so far that only the network, and not the participating nodes themselves, might exhibit adversarial behavior. Both TLC and QSC may be extended to tolerate Byzantine behavior using well known existing techniques, however, as we outline in this section. We address this challenge in three main steps, roughly corresponding to three key layers of functionality from bottom to top: first, enforcing the causal ordering that TLC depends on; second, ensuring TLC's correct time progress in the presence of Byzantine nodes; and third, protecting QSC consensus from adversarial nodes.

The table 1 below is an overview of Byzantine protection mechanism by architectural layers:

TABLE 1

| Layer | Relevant Byzantine protection mechanism(s) |
|---|---|
| consensus | asynchronous Byzantine consensus [?] |
| keysensus | threshold distributed key generation [?] |
| randomness | threshold randomness protocols [?] |
| time release | verifiable secret sharing [?], threshold encryption [?] |
| threshold time | accountable state machines, peer review [?] |
| witnessing | threshold signing [?], witness cosigning [?] |
| gossip | transferable authentication, digital signatures [?] |
| vector time | cryptographic hashes, timeline entanglement [?] |
| logging | tamper-evident logging [?] |
| timestamping | delay imposition for timestamp consistency |
| link | encryption, transport-layer security (TLS) [?] |

7.1 Causal Logging and Accountability

While TLC's goal is to create a "lock-step" notion of logical time, to build TLC and secure it against Byzantine nodes, it is useful to leverage the classic notion of vector time and associated techniques such as tamper-evident logging, timeline entanglement, and accountable state machines.

7.1.1 Logging and Vector Time

Our approach hinges on transparency and accountability through logging and verification of all nodes' state and actions.

Each node maintains a sequential log of every significant action it takes, such a s broadcasting a message.

Each node's log also documents the nondeterministic inputs, such as messages it received, that led it to take that action. Each node assigns consecutive sequence numbers to its log entries. A node's sequence numbers effectively serve as a node-local logical clock that simply counts all the events the node records, independent of both wallclock time and other nodes' sequence numbers.

In addition to logging its own events, each node i also maintains a mirror copy of all other participating nodes' logs, and continuously tracks their progress by maintaining a vector containing the highest sequence number i has seen so far from each other node j. This is the essence of the classic concept of vector clocks.

Because a vector clock indicates only that some node i has seen all the logged events of some other node j up to a particular sequence number in j's local sequence space, node i must process messages from j, and update its vector clock accordingly, strictly in the order of j's sequence numbers. Suppose i has seen all messages from j up to sequence number 3, for example, then receives a message containing j's event 5 out of order. In this case, i must hold this out-of-order message in a reordering buffer and delay its actual processing and internal delivery until i receives a message from j filling in the missing sequence number 4. This reordering process is no different from classic in-order delivery protocols such as TCP. Whenever node i records a new entry in its log, it includes in the new entry a vector timestamp, which documents, for the benefit and validation of other nodes, which messages from all nodes i had seen when it wrote this entry. This vector timestamp precisely documents all the nondeterministic information that led i to take the action this log entry describes. This is also precisely the information that other nodes need to "replay" i's decision logic and verify that i's resulting action is consistent with the protocol that all nodes are supposed to follow, the essential idea underlying accountable state machines.

7.1.2 Exposing Node Misbehavior

To hold nodes accountable, we require each node to make its log cryptographically tamper-evident according to standard practices. In particular, each node chains successive log entries together using cryptographic hashes as back-links, and digitally signs each complete log entry including its back-link and vector timestamp. This construction ensures that nothing in a log's history can be modified without changing the back-links i n all subsequent log entries, making the modification evident.

If a node ever misbehaves in a way that is manifestly identifiable from the contents of its log—e.g., producing a log entry representing an action inconsistent with the prescribed protocol applied to the node's documented history leading up to that log entry then the digital signature on the invalid log entry represents transferable, non-repudiable "evidence" of the node's misbehavior. Correct nodes can gossip this transferable evidence to ensure that all correct nodes eventually know about the misbehavior and can respond appropriately, e.g., by alerting operators and excluding the misbehaving node from the group.

7.1.3 Exposing Equivocation and Forked Histories

Besides producing invalid histories, another way a node can misbehave is by producing multiple conflicting histories, each of which might individually appear valid. For example, a malicious node might produce only one version of history up to some particular event, then fork its log and produce two histories building on that event, presenting one version of its history to some nodes and the other version of its history to others.

To fork its history, a malicious node must by definition equivocate at some point by digitally signing two or more different messages claiming to have the same node-local sequence number. If the malicious node is colluding with a powerful network adversary, we cannot guarantee that correct nodes will immediately—or even "soon"—learn of this equivocation. The adversarial network could schedule messages carefully to keep different correct nodes in disjoint "regions of ignorance" for an arbitrarily long time, each region unaware that the other is seeing a different face of the equivocating node. Nevertheless, provided the network adversary cannot partition correct nodes from each other indefinitely, the correct nodes will eventually obtain evidence of the equivocation, by obtaining two different messages signed by the same node with the same sequence number. These correctly-signed but conflicting messages again serve as transferable, non-repudiable evidence of the node's misbehavior, which the correct nodes can gossip and respond to accordingly. In a general asynchronous setting with no added assumptions, this eventual detection of equivocation is the best we can do.

7.1.4 Causal Ordering in Verification Replay

In order for any node i to validate the logged actions of another node j, i must replay the deterministic logic of j's protocol state machine, and compare it against the resulting event that j signed and logged. Since this action by j likely depended on the messages j had received from other nodes up to that point, this means that i must use exactly the same views of all other nodes' histories as j used at the time of the event, in order to ensure that i is "fairly" judging j's actions. If i judges j's logged event from even a slightly different "perspective" than that in which j produced the log entry, then i might incorrectly come to believe that j is misbehaving when it is not.

Because the verifier node i's perspective must line up exactly with that of the verified node j's perspective as of the logged event, this implies first that i must have received and saved all the causally prior messages—from all nodes—that j had seen upon recording its event. This means that i must process j's messages, and replay its state machine, not just in sequential order with respect tots local log, but also in causally consistent order with respect to the vector tirne- stamps in each of j's log entries.

If one of j's log entries that i wishes to validate indicates that j had seen message 3 from another node k, for example, but i has not yet received message 3 from node k, then i must defer its processing and validation of j's log entry until i's own vector clock "catches up" to j's logged vector time- stamp. Only at this point can i then be sure that it has k's message 3 and all others that j's logged decision might have been based on.

7.1.5 Handling Equivocation in Log Verification

Equivocation presents a second-order challenge in log verification, because correct nodes can expect to detect equivocation only eventually and not immediately. Suppose that correct node i is validating a log entry of another correct node j, which indicates that j had seen message 3 from a third node k. If k is an equivocating node that forked its log, then i might have seen a different message 3 from k than the message 3 from k that j saw in recording its logged action. In this way, k might try to "trick" i into thinking that j misbehaved, when in fact the true misbehior was not-yet- detected equivocation by k. Node i must therefore ensure that when validating another node j's log, i is referring to exactly the same messages that j had seen, even if these might include equivocating messages from other nodes like k that have not yet been exposed as misbehaving. One way to ensure this property is for j to include in its logged vector timestamps not just the sequence numbers of the last mes- sage it received from each other nodes, but also a crypo- graphic hash of that last message j received from each node. Thus, a vector timestamp is in general a vector of both sequence numbers and cryptographic hashes of "log heads".

If a correct node i obtains such a generalized vector timestamp from j, representing a set of messages of other nodes that i "should" have already according to their sequence numbers, but the cryptographic hash of k's last message according to j's vector timestamp does not match the message i already has from k with that sequence number, then i knows that it must defer judgment of whether j or k is misbehaving. Node i asks j for copies of the signed messages from k that j had received and logged. If any of these are correctly-signed by k but inconsistent from those i had seen, then i now has evidence of k's misbehavior. In addition, i uses the version of k's history that j documented, instead of i's own version of k's history, to replay and validate j's logged actions, to avoid the risk of incorrectly judging j as misbehaving.

7.2 Byzantine Hardening TLC

None of the above methods above for holding nodes accountable are new, but rather a combination of existing techniques. These techniques provide all the foundations we need to make TLC resistant to Byzantine node misbehavior, as we explore in more detail now.

7.2.1 Enforcing Correct Logical Time Progress

To protect TLC against Byzantine node behavior, correct nodes must prevent Byzantine nodes both advancing their logical clocks incorrectly, and from tricking other correct nodes into incorrect behavior. For example, a Byzantine node might improperly attempt to: advance its clock faster than it should, before it has received the threshold of messages required for it to advance; claim that a message has been threshold witnessed when it has not; fail to advance its clock when it has received and logged a threshold of messages; or violate logical clock monotonicity by "turning back" its clock. This is merely a sample, not an exhaustive list of potential misbehaviors.

By encoding TLC's rules into the accountable state machine logic by which all nodes verify each others' logs, however, we can detect most of these misbehaviors auto- matically.

In order to advance its clock, for example, any node must not just claim to have received a threshold of messages, but must actually exhibit evidence of its claim. This evidence consists of an appropriate collection of TLC proposal mes- sages from the appropriate timestep, each embedded in the valid and properly-signed logs of a suitable threshold of distinct participating nodes, all with sequence numbers causally prior to ("covered by") the vector clock with which the node announces its time advancement. Since all of this evidence lies in messages causally prior to the time advance- ment in question, correct nodes will automatically obtain and verify this body of evidence prior to processing or verifying the time advancement message itself. As long as the message threshold $t_m$ is larger than the number of maliciously colluding nodes, therefore, the colluding nodes cannot advance time without the cooperation of at least one correct node.

The same verification mechanism precludes nodes from incorrectly claiming a message has been threshold wit- nessed, since no correct node will believe such a claim without seeing the digitally-signed evidence that a threshold of nodes have indeed witnessed the message. Similarly, a malicious node cannot turn back its logical clock without either equivocating and forking its log, which correct nodes will eventually detect as discussed above, or producing a log that self-evidently breaks the monotonicity rule that logical clocks only ever increase, a violation that correct nodes will immediately detect. A malicious node can fail to advance time when it should by delaying the processing and logging of messages it in fact received. This behavior is merely a particular variant of a node maliciously running slowly, which we fundamentally have no way of distinguishing from a node innocently running slowly or failing to receive messages for reasons outside of its control, such as network delays or DoS attacks. Nevertheless, if a malicious node does receive and acknowledge in its log a threshold of suitably-witnessed messages from a given time step, then it must advance its logical clock in the next action it logs, otherwise correct nodes will detect its misbehavior.

Similarly, if a malicious node is at step s and acknowl- edges in its log any broadcast received from some node at a later time step $s+\delta$, then the malicious node must catch up by advancing its clock immediately to step $s+\delta$ or being caught in non-compliance by correct nodes' verification logic. In effect, in order to "drag its heels" and avoid advancing its clock without being caught, a malicious node must entirely stop acknowledging any new messages from other nodes that would force it to advance its clock, thereby eventually becoming behaviorally indistinguishable from a node that is merely offline or partitioned from the network for an extended period.

7.2.2 Majoritarian Reasoning in Byzantine TLC

To adapt the majoritarian reasoning tools described earlier in Section 4.6 to a Byzantine environment, we must adjust the thresholds in much the same way as in existing Byzan- tine consensus algorithms. In particular, we must set the thresholds to ensure that they cover a majority of correct nodes after accounting for the potentially arbitrary behavior of Byzantine nodes.

To define these threshold constraints precisely while maintaining maximum configuration flexibility, we distinguish between availability failures, in which a node follows the prescribed protocol correctly but may go offline or be unable to communicate due to DoS attacks, and correctness failures, in which a node may be compromised by an adversary, leaking its secrets and sending arbitrary messages to other nodes (including by equivocation) in collusion with other compromised nodes and the network. We assume any TLC configuration is motivated by some threat model in which there is a particular assumed limit $f_a \geq 0$ on the maximum number of availability (fail-stop) failures, and another assumed limit $f_c \geq 0$ on the maximum number of correctness (Byzantine) failures.

This decoupling of availability from correctness failures is closely analogous to that done in UpRight.

To apply the majoritarian reasoning from Section 4.6 in such a Byzantine threat model, the message and witness thresholds must satisfy the following two constraints:

1. $t \leq n - f_a$: This constraint ensures that TLC time can advance, ensuring the system remains live, in the absence of any communication from up to $f_a$ nodes.
2. $t > f_c + (n - f_c)/2$ (or $t > (n + f_c)/2$): This constraint ensures that the threshold t is large enough to include all of the $f_c$ potentially Byzantine nodes, plus a majority (strictly greater than half) of the $n - f_c$ correct nodes.

Here we use a single threshold t to represent either $t_m$ or $t_w$, which will typically be the same in practice, except when $t_w = 0$ in the case of unwitnessed TLC.

While we leave the formal definitions and details for later in Section 13, this majoritarian reasoning works in TLC (and QSC) for arbitrary nonnegative combinations of $f_a$ and $f_c$. These parameters can in principle represent separate and independent sets of unavailable and Byzantine nodes, respectively, which may or may not overlap.

That is, TLC can tolerate $f_a$ correct but unreachable nodes and an additional $f_c$ responsive but malicious nodes.

If we assume just one set off generic "faulty" nodes, each of which might be unresponsive and/or malicious (i.e., $f = f_a = f_c$), and we set $t = n - f$, then the above constraints reduce to the classic $n > 3f$ (or equivalently $n \geq 3f + 1$) commonly assumed by Byzantine consensus algorithms. But this represents only one possible and sensible configuration of TLC's thresholds.

If we set $f_c = 0$, then the above constraints reduce to the basic fail-stop model as we assumed in Section 4.6, where a "simple majority" threshold $t > n/2$ is adequate.

But arbitrary intermediate values of $f_c$ are possible and interesting as well. Suppose, for example, we set up a classic BFT-style group of n nodes where initially $f_a = f_c = f$ and $n > 3f = 2f_a + f_c$. If during the group's operation, a malicious node is actually exposed as malicious by triggering the accountability mechanisms discussed above, then one reasonable automated response may be to expel it from the group. Doing so reduces both n, $f_c$, and t by 1, while leaving $f_a$ unaffected since correct-but-slow nodes aren't expelled. In the limit case where all $f_c$ malicious nodes eventually expose themselves, the group gradually reconfigures itself from a classic BFT configuration ($n > 3f = 2f_a + f_c$) into a classic Paxos-like fail-stop configuration $n > 2f = 2f_a$).

TLC also does not inherently assume or require that correct nodes outnumber Byzantine nodes: that is, $n - f_c$ may potentially be less than $f_c$. In the limit case where $f_a = 0$, the above constraints reduce to $n > f_c$, the any trust model. In such a configuration, liveness and progress require all n nodes to participate, tolerating no unavailability or unreachability, but there need be only one correct node. All other nodes may collude, and no one needs to know or guess which node is correct.

7.2.3 Proactive Anti-Equivocation Via Witnessing

Although the accountability mechanisms above ensure that correct nodes will eventually expose equivocation by malicious nodes, protocols built atop TLC might still be subverted in the short term by equivocation attacks before the equivocation is detected. In witnessed TLC with the witness threshold $t_w$ satisfying the majoritarian constraints above, however, the threshold witnessing process built into each TLC time-step offers a natural proactive form equivocation protection, a consequence of the proactive accountability offered by witness cosigning.

In particular, protocols built atop TLC with a majoritarian witness threshold can rely on never seeing two equivocating threshold witnessed messages. This is because for any malicious node to get two equivocating messages for the same time step threshold witnessed, it would have to obtain a transferable body of evidence including a witness threshold $t_w$ of valid, properly-signed witness acknowledgment messages for each. This threshold would require a majority of correct nodes to witness and cosign each equivocating message, implying that at least one correct node would have to sign both messages. But if a correct node ever sees a second messages with the same sequence number from the same node, it does not accept or witness the second, but instead uses it as evidence to expose the equivocating node's self-evident misbehavior.

7.2.4 Majoritarian Tune Period Delineation

Figure 10:
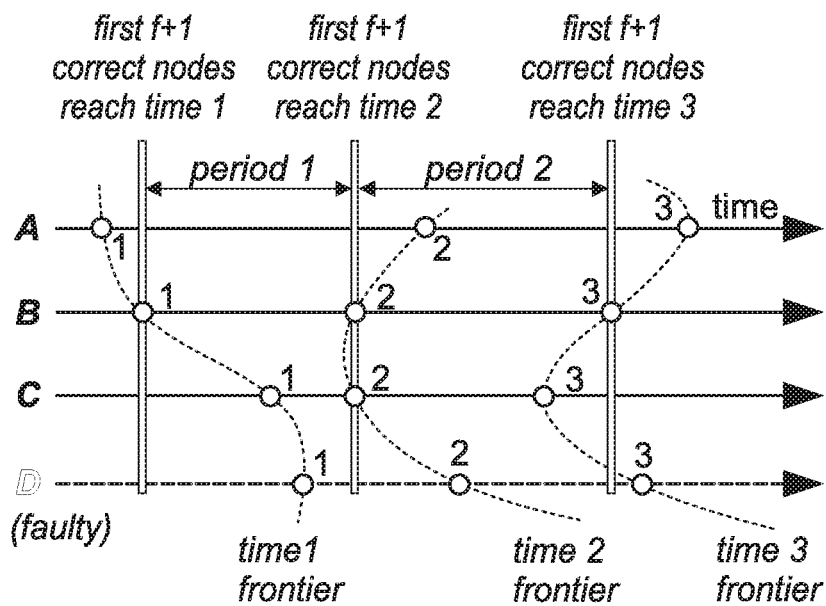
FIG. 10 illustrates global time periods dernarked by the moments a majority of correct nodes reach a threshold time t.
Figure 11:
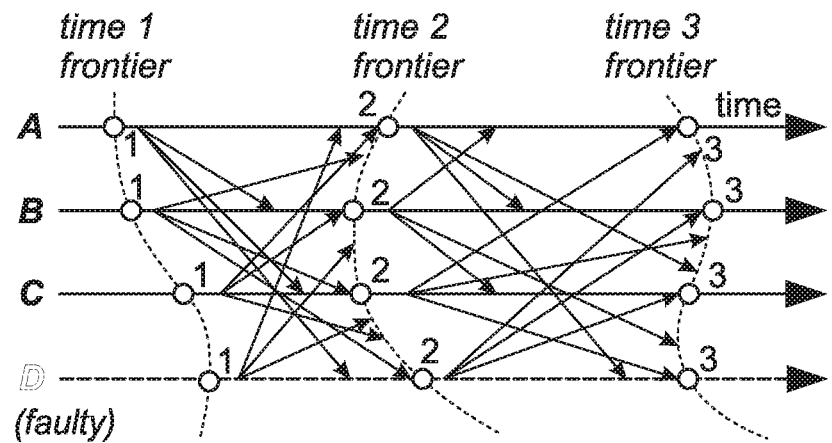
FIG. 11 illustrates basic threshold logical clocks without threshold witness certification. In this example, each node waits to receive a threshold number of messages at each logical time step (3 of 4 including its own in this example).
Figure 12:
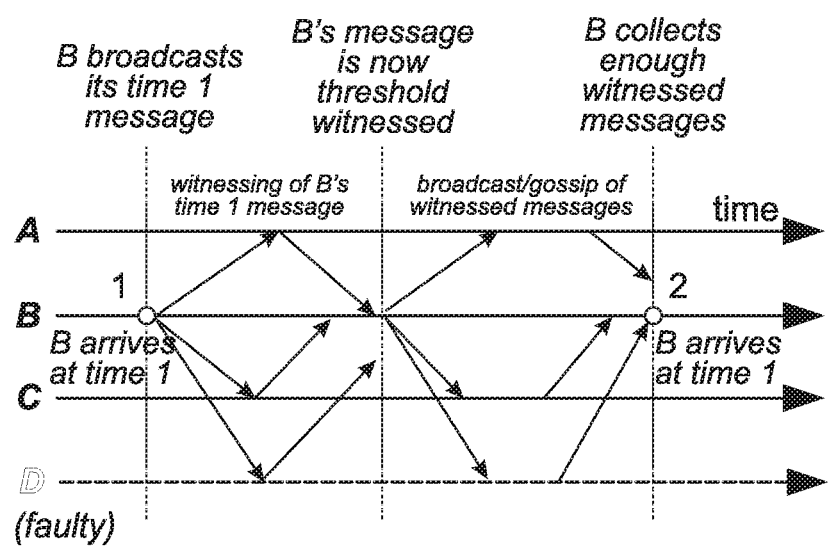
FIG. 12 illustrates one witnessed TLC time-step from the perspective of one particular node B.

With the above adjustments to the thresholds, the time period delineation described earlier in Section 4.7 extends naturally to the Byzantine environment. In particular, the "critical moment" that determines when a new time period s begins is the moment when a majority of correct nodes reach step s. When any the $f_c$ Byzantine nodes advance their clocks is thus irrelevant to the conceptual delineation of time periods. FIG. 10 illustrates this process.

Even though the correct nodes have no realistic means of determining either which other nodes are correct or precisely when each time period begins and ends, nevertheless this conceptual delineation imposes strict bounds on when any valid message labeled for a given time step may have been formulated.

First, as long as the message threshold $t_m$ satisfies the above constraints, no one can reach or produce a valid message for time step s+1 or later before time period s has started, Reaching step s+1 requires exhibiting a "body of evidence" that includes valid, properly-signed messages from a threshold t of messages from steps. This threshold set must include a majority of the correct nodes even after being "maximally corrupted" by up to $f_c$ Byzantine nodes, Since such a majority of correct nodes is unavailable until a majority of correct nodes reach step s and thus collectively enter time period s, no malicious node can produce a valid message labeled s+1 or later before period s starts, without being exposed as malicious.

Second, in witnessed TLC where $t_w$ satisfies the above constraints, no one can formulate and produce any new threshold witnessed message for step s after time period s ends and period s+1 begins. This is because such a message would have to be verifiably witnessed by a threshold $t_w$ that includes a majority of correct nodes even after being maximally corrupted by up to $f_c$ Byzantine nodes. Such a majority of correct nodes is unavailable after period s ends, because correct nodes refuse to witness messages for step s after having advanced to step s+1. A node that formulates a message m and gets at least one witness cosignature for it before period s ends might still be able to finish getting m threshold witnessed after period s+1 starts, but this does not violate the time bounds because m was formulated during step s.

7.2.5 Two-Step Broadcast

Byzantine-protected rnajoritarian witnessed TLC similarly enforces the two-step broadcast property described earlier in Section 4.8. Any message m a node broadcasts at some step s that is threshold witnessed and used in advancing to step s+1 is guaranteed to have been witnessed by a majority of correct nodes by the time they reach s+1. This majority must overlap by at least one correct node with the majority of correct nodes from which any node must gather step s+1 messages to advance to step s+2.

This overlapping correct node will always reliably propagate knowledge of m, even if other malicious nodes might "forget" or equivocate about it. Thus, the majorities of correct nodes alone ensure that knowledge of each message threshold witnessed at s+0 propagates to all nodes by the time they reach s+2.

Even a malicious node cannot pretend not to have seen m by s+2, because the malicious node must exhibit the appropriate body of evidence to convince correct nodes it has reached s+2 in the first place. That body of evidence must have a threshold of signed messages from other nodes including at least one from a correct node that conveys knowledge of m, and the malicious node can neither omit nor forge this message referring to m without producing an invalid log and being exposed as corrupt.

Monotonicity: Because the TLC protocol's deterministic state machine contains no transitions in which a node decreases its logical time, any node that produces only one sequential log can never decrease its logical time without being caught in violation of the state machine. The only way a mis behaving node i can "roll back time" is by forking its log at an earlier point. Any correct node j will detect this fork and exclude i as soon as j causally observes both branches of the fork.

Pacing: A misbehaved node i might try to "race ahead" by advancing its dock to some time t+1 before network communication permits. Any correct node j receiving a message M from i at time s+1, however, will detect i's misbheavior and exclude it unless M contains all the transferable "evidence" in its causal history to "prove" that i legitimately reached s+1. This evidence must include correctly-signed messages from $t_m$ notes at time s each supported by to acknowledgments at time s—as well as similar historical evidence for all earlier times $0 \leq s' < s$. Provided $t_m > f_c$, the adversary cannot fabricate this evidence without genuine communication with at least $t_m - f_c$ honest nodes at each time-step.

Liveness: TLC's liveness depends only upon nodes receiving a threshold number of broadcasts with particular labels (logical time and type, either message or acknowledgment). Node and message corruptions that affect only an expected broadcast's content and not its label, therefore, have no impact on TLC's liveness. Because our adversary model considers a message label change to be a simultaneous corruption and an indefinite delay attack (Section 13.1.2), TLC's tolerance of up to $f_d$ indefinitely-delayed nodes already accounts for such attacks.

7.3 Equivocation Protection

We'll now assume T=2f+1, since at least this threshold is fundamentally required under the full asynchronous network model to offer any protection against an equivocating adversary.

Stable core concept: once the first f+1 honest nodes have reached a given time t, and are in agreement in some fashion (either in terms of consensus or any other shared viewpoint fact), no adversarial behavior can successfully contradict their agreement in a way that will be accepted by any honest node in any subsequent timestep t+1 or later. This is because any honest node reaching time t+1 or later will have heard from at least 2f+1 nodes at time step t, of which at least f+1 are good, and of which at least 1 good node overlaps with the stable core (the first f+1 good nodes to reach time t+1). If any message from any malicious node attempts to contract the knowledge of the stable core through equivocation, then this 1-good-node overlap at time t will ensure that the potential good victim node at time t+1 learns of the equivocation (both the stable core version and at least one alternate attack version), exposes the equivocation, and ensures that the good victim node permanently eliminates and ignores messages from the equivocating node(s) going forward, effectively turning the equivocating nodes into virtual "fail-stop" nodes.

7.4 Byzantine Consensus with QSC

Byzantine-protecting the QSC3 consensus protocol described in Section 6 involves two challenges: first, protecting the basic consensus logic and state machine from Byzantine manipulation, and second, ensuring that Byzantine nodes cannot leak the proposals' genetic fitness lottery tickets to the network adversary before the 3-step consensus round is complete.

7.4.1 Protecting the QSC Consensus Logic

Each node's QSC consensus logic must make two key decisions in a consensus round starting at a given TLC step s. First, the node must choose the best eligible (confirmed) proposal the node is aware of by step s+3, as the proposal to build on in the next round. Second, the node must determine whether it may consider this best eligible proposal to be committed, according to whether the proposal is reconfirmed (doubly confirmed) and not "spoiled" by another proposal with a competitive lottery ticket.

The standard state machine accountability and verification mechanisms above are sufficient to force even a malicious node i to make these decisions correctly, or else be exposed as misbehaving before their incorrect decisions can affect any correct node. This is because both i's best eligible proposal decision and its commitment decision are well-known, deterministic functions of the precise set of causally prior messages i had seen by step s+3 as documented in i's log. Upon receiving and processing i's broadcast at step s+3, each correct node simply replays i's QSC consensus decisions independently based on the same set of causally prior messages that i used, and expose i as misbehaving if its logged decisions are incorrect.

7.4.2 Protecting the Ticket Values

As discussed in Section 6.9, QSC's guarantee that each round enjoys a reasonable (at least 1=2) independent prob the lottery ticket values early and use them to schedule message delivery maliciously based on them. In addition, QSC's success probability also depends on all nodes choosing their proposals' lottery tickets fairly from the same random distribution. As soon as we admit even a single Byzantine node ($f_c > 1$), that node might break the consensus protocol either by leaking all proposals' lottery ticket values to the network adversary during step s+0, or by choosing its own proposals' lottery tickets unfairly, e.g., so that the Byzantine node always wins.

Since we must assume a Byzantine node will leak anything it knows to the adversary, we must force all nodes to choose their proposals' lottery tickets such that even they cannot learn, predict, or bias their choice of ticket before it is revealed to all at step s+3. Fortunately, a protocol such as RandHound, which implements public randomness through leader-based joint verifiable secret sharing (JVSS) provides exactly the required functionality. We can readily incorporate such a protocol into QSC for unpredictable and unbiasable lottery ticket selection.

7.4.3 QSC4

One solution is to use a Publicly Verifiable Secret Sharing (PVSS) scheme that permits the homomorphic addition of multiple shared secrets generated by independent dealers. We extend QSC by one additional TLC time-step, so that a full consensus round requires four steps total (QSC4).

Initially at s+0, each node i chooses a random secret $s_i$ and a secret-sharing polynomial $p_i(x)$ such that $p_i(0)=s_i$. Node i's polynomial $p_i(x)$ is of degree $t_m-f_{ck}-1$, where $f_{ck}$ is the number of known corrupt nodes that have been exposed so far in i's view. Node i then deals PVSS secret shares only to the $n-f_{ck}$ nodes not known to be corrupt. Node i includes its commitments to p(x) and its publicly-verifiable encrypted shares in its step s+0 proposal. Because these deals are publicly verifiable, all correct nodes can immediately ensure that each node's deal is valid and immediately expose any node that deals an incorrect secret (e.g., containing secret shares that the intended recipients cannot decrypt).

We then embed the QSC3 consensus protocol into steps 1-4 of PVSS-based QSC4. At step s+1, each node has received a threshold $t_m$ of PVSS secrets dealt at s+0. Each node i chooses at least $f_{cu}+1$ such valid secrets dealt by nodes not yet exposed in misbehavior from i's viewpoint, where $f_{cu}$ is the maximum number of unknown potentially-corrupt nodes not yet exposed ($f_{ck}+f_{cu}=f_c$). Because the set of $f_{cu}+1$ deals that i chooses must include at least one by a correct node not colluding with the adversary, this correct node's deal both uniformly randomizes i's lottery ticket and ensures that it remains unknown and unpredictable to i or anyone else until s+4.

Nevertheless, i's choice of a specific set of $f_{cu}+1$ deals at represents a commitment to one and only one lottery ticket, which thereafter cannot be changed or biased by anyone including i.

At the end of the consensus round, each node includes in its step s+4 message its decrypted shares from all the deals it saw from step s+0. To determine the lottery ticket for a given node i's proposal pi from s+1, each node j must obtain and linearly interpolate $t_m$ shares, minus any missing shares for nodes known corrupt by s+1, from each of the $f_{cu}+1$ deals that $p_i$ committed to, and combine them to reconstruct the joint secret Si represented by i's chosen set of deals. While unpredictable and unbiasable, $S_i$ will be the same for all nodes that used the same set of deals in their proposals, whereas we need each lottery ticket $T_i$ to be unique and independent for each node i. We therefore use Si not directly as proposal i's lottery ticket, but as a key for a hash of some unique consensus group ID G, consensus round number r, and node number: $T_i=H_{Si}(G, r, i)$.

Because decrypted shares from a majority of correct nodes are required to reconstruct the secret dealt by any correct node, anyone including the adversary can reconstruct these secrets only after a majority of correct nodes have reached s+4, and have thereby collectively entered the next global time period following the completion of the consensus round. At least for this majority of correct nodes, therefore, the adversarial network's schedule of message deliveries for this round is complete, fixed, and "in the past" at this point, ensuring that this majority of correct nodes observes the correct probabilities of success discussed in Section 6.9. The network adversary might affect the delivery schedules seen by the minority of correct nodes that reaches s+4 later, and hence the odds of success that these nodes directly observe. But even such a "latecomer" node j will have by s+5 heard from at least one member i of the majority that was first to reach s+4, and hence if i observed the round to succeed at s+4 then j will know that fact as well by s+5.

It is possible that some PVSS deals used in proposals at step s+1 may not become known to all nodes by s+4, making their dealt secrets unrecoverable by nodes that obtain fewer than necessary shares at s+4. The only proposals eligible for consensus, however, are those that were threshold witnessed during step s+1. As described in Section 6.5, this guarantees that all nodes will have seen any eligible proposal, and hence the deals it relies on, by s+3.

If a node cannot reconstruct some proposal's lottery ticket at s+4, therefore, the node may assume this means the proposal is ineligible and simply discard it. An advantage QSC4 has over most randomized asynchronous Byzantine consensus protocols is that it needs no "common coins" or the distributed key generation (DKG) processes needed to establish them in practice without a trusted dealer. Each proposer i effectively chooses its own lottery ticket at s+1, through its particular choice of $f_{cu}+1$ deals to use, although i cannot tell in advance what ticket value it chose and committed to. A disadvantage of QSC4 is that because the readily-available PVSS schemes may be used only once, all nodes must incur the computational and communication costs of dealing, verifying, and reconstructing fresh PVSS secrets for every consensus round. We will explore later in Section 8 how we can build on QSC to implement an asynchronous distributed key generation (DKG) protocol that produces reusable shared secrets, amortizing the costs of this boot-strap over many subsequent consensus rounds that can generate public randomness much more efficiently as in RandHound or drand.

8 Distributed Key Generation

A large variety of security applications and services require, assume, or can benefit from a distributed key generation (DKG) protocol. DKG enables a group of nodes to generate a threshold secret-shared public/private key pair cooperatively, so that none of the members ever know or learn the composite private key. Each member knows a share of the private key, however, so that any threshold number of members can work together to use it according to an agreed-upon policy. Example applications that typically depend on DKG include threshold schemes for encryption and decryption, digital signing, identity-based encryption, public randomness beacons, secure data deletion, accountable data access control, credential issuance and disclosure, electronic voting, and general multiparty computation.

8.1 The Challenges of DKG

Distributed key generation in general is not easy, however. We could rely on a trusted dealer to deal shares of a public/private keypair via verifiable secret sharing (VSS), but the trusted dealer is a single point of compromise. We could require all n participating nodes to deal secrets using VSS and combine all n deals homomorphically to produce a joint secret that no one can know or bias as long as at least one node is correct (the anytrust model), but this DKG process can tolerate no unavailability or unreachability and hence is highly vulnerable to denial-of-service.

Combining only $f_c+1$ VSS deals is sufficient in principle to ensure that it includes at least one contribution by a correct node. There are $$\binom{n}{f_c+1}$$

possible choices of such subsets, however, and the group must agree on one and only one particular subset, an agreement task that requires consensus. Most of the practical and efficient asynchronous algorithms rely on common coins, yielding a chicken-and-egg problem. We need common coins to enable asynchronous consensus to agree on a particular set of VSS deals to generate a distributed keypair to produce common coins.

One way around this challenge is to drive the DKG process using traditional leader-based consensus, which introduces partial synchrony assumptions to ensure liveness.

Another circumvention is to assume the group evolves gradually via a series of occasional group reconfiguration and DKG events. The first DKG runs manually or synchronously. For each subsequent DKG event, an existing asynchronous consensus group using common coins from the previous DKG configuration agrees asynchronously on a set of VSS deals representing the next configuration. While supporting full asynchrony after initial launch, this approach unfortunately makes the security of every DKG configuration critically dependent on that of all past configurations. If anyone configuration is ever threshold compromised, then the adversary can retain control forever and security is never recoverable.

8.2 Que Sera Distributed Key Generation

Because QSC requires no already-agreed-upon common coins, we can adapt it for asynchronous DKG without partial synchrony or secure history assumptions. We call the result que sera distributed key generation or QSDKG.

The main remaining technical challenge is that to give all nodes reusable long-term key shares, we cannot use PVSS schemes that encrypt the shares into exponents to make them amenable to zero-knowledge proofs. We must therefore make do with (non-publicly-) verifiable secret sharing (VSS) schemes, in which an encrypted share is verifiable only by the share's recipient.

To protect liveness, the DKG protocol will have to wait until only a threshold $t_w$ of nodes have had a chance to verify their shares of any given deal before moving on. This leaves a risk, however, that a misbehaving node may deal incorrect shares to up to $f_a$ correct nodes undetectably during the DKG. Since we cannot detect this situation before the DKG completes, the network adversary could compromise liveness later if any correct nodes are missing shares dealt for a full $t_m$ threshold. We must therefore ensure that all correct nodes obtain correct shares, including the $f_a$ that couldn't verify their shares during DKG itself. For this purpose we adapt techniques from asynchronous verifiable secret sharing (AVSS).

In addition to the majoritarian message and witness thresholds $t_m$ and $t_w$ each satisfying $(n+f_c)/2 < t \le n-f_a$ as discussed in Section 7.2.2, QSDKG also relies on a share recovery threshold $t_r$ satisfying the constraints $f_c < t_r \le n-f_a-f_c$. In a classic Byzantine consensus configuration in which $f_a = f_c = f$ and $n > 3f$, for example, we set $t_m = t_w = n-f$ and $tr = n-2f$, so $tr > f$.

To generate a new distributed keypair starting at TLC time step $s+0$, each node deals a fresh secret by choosing a random bivariate polynomial $p(x; y)$ of degree $t_m-1$ in x and of degree $tr-1$ in y. The dealer's secret is $p(0; 0)$. The dealer includes in its TLC step $s+0$ broadcast a $t_m \times t_r$ matrix of commitments to the polynomial, and an $n \times n$ matrix of secret shares, each share $S_{ij}$ encrypted with a random blinding exponent $r_{ij}$ such that $S_{ij} = g^{r_{ij}} p(i; j)$. Finally, for each i and j, the dealer includes in its step $s+0$ broadcast ElGamal encryptions of $g^{r_{ij}}$ to each of node i's and node j's public keys, along with a zero-knowledge proof that the dealer knows $r_{ij}$ and that these ElGamal encryptions to nodes i and j are consistent.

A misbehaving dealer can still incorrectly encrypt the share $S_{ij}$, but if it does so, both nodes i and j will be able to detect and expose this misbehavior by revealing the blinding factor $r_{ij}$ along with a zero-knowledge proof of either ElGamal ciphertext's correct opening. For this deal to be eligible for subsequent use in the DKG, the dealer must obtain a witness threshold $t_w$ of cosignatures on it its $s+0$ broadcast. Correct witnesses provide these signatures only if both their rows and columns of the dealer's share matrix check out; otherwise they expose the dealer's misbehavior by opening an incorrect share.

At step $s+1$, each node i then chooses and proposes a particular set of $f_c+1$ threshold witnessed deals from step $s+0$, then commences a series of 3-step consensus rounds at least until all nodes have observed commitment. Each node i's particular choice of $f_c+1$ deals at $s+1$ determines the lottery ticket associated with i's proposal in the first consensus round starting at $s+1$. In subsequent rounds, each proposal's lottery ticket is determined by the set of deals from the first proposal in the history the proposer builds on. If in the first consensus round node i chooses node j's step $s+1$ proposal as the best eligible, then the lottery ticket for node i's proposal in the second round starting at step $s+4$ is determined by the deal node j chose at $s+1$, since that is the deal at the "base" of the history i adopted. In this way, as soon as all nodes have observed commitment at least once, they will all have agreed on a common prefix history including a common choice of $f_c+1$ deals to serve as the DKG result. The participating nodes can then cease consensus rounds if only the DKG result was needed, or continue them if regular consensus is still needed for other purposes.

Accounting for the $f_a$ correct nodes that may not have a chance to verify their shares in a given deal, plus the $f_c$ nodes that might dishonestly verify their shares, we can be sure that at least $n-f_a-f_c$ full rows and columns of the encrypted share matrix were properly verified by correct nodes. Since $t_r \le n-f_a-f_c$, this ensures that every node i will obtain enough correct shares of its resharing polynomial, represented by $p(i; y)$ with threshold $t_r$, to reconstruct its share of the main secret sharing polynomial, represented by $p(x; 0)$ with threshold $t_m$. Since $t_r > f_c$, however, the $f_c$ misbehaved nodes cannot alone reconstruct and learn the secret shares of correct nodes.

9 A Coordination Architecture

In the above expositions of TLC and QSC we have made many simplifying assumptions for clarity, such as assuming no Byzantine nodes and causally-ordered message propagation. We also ignored many additional requirements, and optional but "nice-to-have" features, that we often want in a practical distributed coordination system.

We now address the challenge of building practical asynchronous distributed systems logically clocked by TLC. Following the tradition of layering in network architectures, we will adopt a layered approach to build progressively the functionality and abstractions we need to implement TLC and QSC in a clean and modular fashion. Consistent with layered architecture tradition, each layer in our distributed coordination architecture will depend on and build on only the layers below it to add a minimal increment of functionality or abstraction needed by or useful to the layers above it.

A key goal of this architecture is to tolerate not only an asynchronous network but also Byzantine node behavior. The Byzantine consensus problem is traditionally addressed using protocols specifically designed for this purpose, which are fairly different throughout from their non-Byzantine counterparts such as Paxos. The architecture introduced here, in contrast, shows how the application of relatively standard protection tools in appropriate architectural layers, such as cryptographic algorithms, Shamir secret sharing, and Peer-Review, can make the QSC protocol described above Byzantine fault tolerant without any fundamental changes to the consensus protocol's basic logic or operation.

Table 2 briefly summarizes the layers of the distributed coordination architecture we develop here. While important interdependencies between the functional abstractions implemented by the layers motivate this layering, there is nothing fundamental or necessary about a layered approach or this particular layering: many other decompositions are certainly possible. As usual, layering achieves modularity and simplicity of each layer at a potential risk of introducing implementation inefficiencies due to cross-layer coordination, or potentially increasing the complexity of the complete system over a tightly-focused and carefully optimized "monolithic" design.

TABLE 2

| Layer | Description |
| --- | --- |
| consensus | single globally-consistent historical timeline |
| randomness | unpredictable, unbiasable public randomness |
| time release | withholds information until designated time |
| threshold time | communication-driven global notion of time |
| witnessing | threshold certification that nodes saw message |
| gossip | indirect message delivery between node pairs |
| vector time | ensures nodes have complete causal history views |
| logging | logging of nondeterministic events nodes observe |
| real time | labeling events with approximate wall-clock time |
| messaging | direct messaging between pairs of nodes |

While this architecture is driven by the goal of developing a clean, modular, efficient, and practical approach to asynchronous Byzantine consensus, many of the lower layers that the architecture incorporates can also serve other, general purposes even in distributed systems that may not necessarily require consensus.

Shorter stacks comprised of only a subset of the layers described here may be useful in such situations.

9.1 Basic Elements of Consensus

Before developing the architecture layer-by-layer, we first break down the architecture's layers into three functional categories representing three basic elements of consensus: choice, timing, and rapport between participants.

Choice: Consensus requires choosing making a choice among alternatives: typically by choosing among either leaders or among proposals. Leader-driven protocols such as Paxos and PBFT first choose a leader and that leader drives the choices until the leader fails (the detection of which typically requires timeouts, violating asynchrony), resulting in a view change. In randomness-driven consensus protocols such as Bitcoin and this, participants first form potential choices for each round, then we use a source of randomness to choose among them, Supporting this choice among proposals is the purpose of the randomness layer in our architecture, which in turn builds on the time release layer immediately below it.

Timing: In any consensus algorithm, nodes need to know when to make a choice (or when a choice has been made), either among proposals for a decision or among potential (new) leaders. Much of the complexity of leader-based protocols is due to the difficulty of coordinating the numerous timing-related decisions nodes must make: when a proposal is accepted, when a proposal is committed, when a node decides that a leader has failed, when enough nodes have decided this to trigger a view change, when a new leader knows enough to take over from the last one, etc. Asynchronous consensus protocols fundamentally need to be threshold-based rather than timeout-based in their timing decisions, but the question of how many messages of what kinds are "enough" often tends to be complex. Our architecture uses threshold logical time to decompose all the main timing and progress decisions into a separate layer—the threshold time layer—that uses a threshold logic to form a global logical clock to drive all key timing decisions in the layers above it.

Rapport: Consensus participants need not just "raw communication" with each other but also in practice must have a way to know what other participants know at a given point. This mutual understanding is often required for a node to know when a sufficient number of other nodes know "enough" so that an important fact (such as a proposal's acceptance or commitment) will not be forgotten by the group even if individual nodes fail. While monolithic consensus protocols use integrated, ad hoc mechanisms to achieve the inter-node rapport needed for consensus, our architecture instead decomposes rapport-establishment functions into separate lower layers that can be easily understood and cleanly implemented by classic protocols. In particular, three layers of our architecture are devoted to three complementary forms of rapport-building. Our witnessing layer enables nodes to learn when a threshold of participants have seen and validated a particular message or historical event.

Our vector time layer enables nodes to reason causally about history and determine precisely what events other nodes had seen before a given message or event. Finally, our gossip layer ensures that participants can exchange information and build rapport indirectly asw well as directly, to ensure that correct nodes with slow or unreliable connectivity may still be included as reliably and securely as possible in consensus.

9.2 Four Contrasting Notions of Time

While this paper's central novel contribution is the notion of asynchronous threshold time and a distributed coordination and consensus architecture built on it, this architecture also internally leverages and builds upon other classic, complementary notions of time. We utilize four different conceptual notions of time, in fact, in different elements and for different purposes in the architecture:

Real time: Although consensus in our architecture is driven asynchronously purely by communication and requires no timeouts, we nevertheless use real or "wall-clock" time, as measured by each node's system clock, to label blocks with the date and time they were committed, and to allow the timed release of contributions after designated moments in real time as described below. We assume that correct nodes' system clocks are roughly synchronized purely for these block-labeling and timed release purposes, but Byzantine nodes' clocks may behave arbitrarily.

Node-local log time: For coordination and accountability purposes each node maintains its own tamper-evident append-only log of all the nondeterministic events it observes, such as message arrivals, as described below. Each such event increments the node's local log time by one, independent of real wall-clock time or other nodes' log timelines.

Vector time: As nodes communicate and learn about new events in other nodes' logs, each node i maintains an N-element vector of the most recent local log times it knows about across all nodes. This vector time precisely represents the exact set of historical events across all nodes that are causally prior to the present moment at node i. Our architecture uses vector time pervasively to enable nodes to reason about what other nodes saw or knew at specific historical moments, and for systematic accountability via PeerReview as described later.

Threshold time: Finally, our consensensus architecture both provides and internally uses threshold logical time as a global metric of asynchronous communication progress across the (fastest threshold subset of) all N participants.

9.3 The Consensus Architecture by Layer

We now briefly describe the functional purpose of each layer in the consensus architecture. For clarity, we also point out at least one simplistic potential "baseline" implementation approach for each layer. These baseline implementations approaches are meant only to be illustrative, and would meet neither our efficiency nor security objectives in practice. We defer the description of more practical and secure, but also inevitably more complex, implementations of these layers to Section 7.

Messaging layer: The messaging layer represents the baseline functionality this architecture builds on, namely a primitive point-to-point communication capability allowing message transmission directly between pairs of nodes. In Internet-based deployments, the messaging layer in our architecture typically maps to connections via TCP, TLS, or another point-to-point overlay protocol.

This layer effectively represents the underlying network infrastructure that this paper's architecture build on top of, and thus is not implemented in this architecture but instead represents the underlying network API (e.g., TCP/IP) that the architecture builds on.

We do not assume the underlying messaging layer supports broadcast or multicast, but can make use of such a facility if available. If no broadcast/multicast is available in the underlying messaging layer, then a broadcast/multicast simply means N point-to-point transmissions to each of the N participants.

Real time layer: Messages labeled with a particular wall-dock time on transmission get delayed at the receiving end if necessary un-til the designated wall-clock time passes by the receiver's clock. This way, if the sender's or receiver's wallclock time are way off, this manifests either as a long perceived (virtual) wall-clock delay, or a long actually-imposed delay if the receiver's clock is ahead. In either case, it causes upperlevel threshold proto-cols built on it to ensure that a consensus proposal labeled with a given wall-clock time cannot be committed until a thresh-old of correct nodes all consider their wall-clock time to be no less than the proposed block's wall-clock time label. The time-release layer below can build on this to allow time release based on wall-clock as well as threshold logical time . . . .

Gossip layer: The gossip layer adds atop the messaging layer a capability for participating nodes to pass messages indirectly between pairs of nodes whose direct connectivity may be slow (e.g., due to triangle inequality violations or nonfunctional due to routing failures or denial-of-service attacks against the direct communication path between pairs of otherwise correct nodes. A functional but extremely inefficient implementation of this layer is for every node simply to re-broadcast to all N participants each new message it receives that it has not seen already. Classic gossip protocols can provide robust, scalable implementations of this layer.

Vector time: The vector time layer assigns local integer sequence numbers to each message that any node sends, allowing nodes to reason about causality and information propagation via classic vector and matrix clock techniques.

In addition, the vector time layer ensures that the messages a node receives are delivered to upper layers only in a causally consistent order. That is, the vector time layer at a node i will not deliver any message m to dependent upper-layer protocols until all other messages causally prior to m have been received and delivered. In FIG. 13, for example, if message $m_1$ from C to B arrives at time $t_{B2}$, the vector time layer at B will not deliver m1 locally—but instead delay it as necessary—until B has obtained and locally delivered all other messages that were in C's causal "history cone" leading up to the transmission of $m_1$ at $t_{C1}$.

Vector time and ordering serves both a general purpose and a consensus-specific purpose in our architecture. The general purpose is to ensure that each participant obtains complete information about exactly which historical events every other node had seen at any moment causally prior to the observer's current time. This complete-historical-information property is helpful in numerous ways both throughout our architecture's upper layers and in many other group communication protocols.

In addition, vector time in our architecture serves the consensus-specific purpose of ensuring inclusiveness: the property that even the slowest or most poorly-connected correct nodes can eventually and regularly contribute to the output of consensus. Inclusiveness is related to but stronger than the notion of chain quality, which merely ensure that a sufficient fraction of consensus output (e.g., blocks or transactions) come from correct nodes, while allowing that up to f of the slowest correct nodes might never contribute to the consensus output.

A functional but impractically inefficient implementation of the vector time layer is for each node simply to bundle into each message m it transmits a copy of the entire causal history it has observed up to that point—i.e., all causally prior messages transmitted by any node before m. This implementation is merely illustrative, and may be useful for formal modeling; we outline the approach we take in practice later.

Witnessing: The witnessing layer allows a node i that sent some message m to learn—and further indicate to other nodes—when some threshold Tw of participants have received and confirmed seeing m. The witnessing layer thus performs a function analogous to acknowledgment in reliable point-to-point protocols like TCP, but generalized to group communication contexts in which many of the N participants are expected to receive and witness (acknowledge) each message that any group member receives.

Once a node has collected Tw witness acknowledgments on a message m, we say that the message has been witnessed. This layer delivers received messages locally to upper layers only once they are witnessed. The important property this behavior enforces is that once a higher layer on any node i has received a message m from another node via the witnessing layer, i knows that at least $T_w$ nodes total have seen and validated m, not just i itself. Upper layers can control when and under what conditions the witnessing layer starts or stops witnessing messages of specific classes (e.g., messages labeled with particular identifiers in their headers), to enforce semantic and temporal properties defined by the upper layer.

An implementation of this layer, which assumes that all nodes are well-behaved, is simply for each node to reply with an acknowledgment to each new upper-layer protocol message the node receives, just as TCP/IP and numerous other classic protocols do. A more realistic instantiation uses digital signatures to produce transferable but cryptographically unforgeable "evidence" of message receipt, and uses threshold signing or witness cosigning to compress the space and verification costs of reducing O(N) witness cosignatures on the same message. In addition, Byzantine-protected implementations of this layer can offer proactive protection against equivocation and other detectable forms of misbehavior, because honest nodes will not witness-cosign invalid or equivocating messages.

Threshold time: The threshold time layer implements a global notion of time operating in lock-step across all the N nodes, in contrast with the node-local sequence numbers and clocks implemented by the vector time layer. In essence, at any given threshold time t, the threshold time layer at each node i waits until it has received time t messages from a threshold of $T_m$ unique nodes before advancing to time t+1.

Since the threshold time layer builds upon the witnessing layer, the collection of $T_m$ messages a node i needs to advance to time t+1 is in fact a collection of $T_m$ witnessed messages, each of which has been witnessed (acknowledged or signed) by at least $T_w$ nodes. In addition, the threshold time layer at any node i uses its control over the witnessing layer to start witnessing messages labeled with time t only upon reaching time t and not before, and to stop witnessing time t messages upon reaching time t+1, ensuring in effect that messages witnessed by correct nodes at time t were witnessed during logical time t and not before or after. This interaction between the witnessing and threshold time layer ensures the important property that upon advancing to time t+1, each node i knows that at least $T_m$ messages from time t were each seen (and witnessed) by at least $T_w$ nodes during threshold time t.

Since each node may reach its condition for advancing from t to t+1 at different wall-clock times, logical time advancement generally occurs at varying real times on different nodes. In a Byzantine consensus context where $N \geq 3f+1$ and $T_m=T_w=2f+1$, however, we can divide wall-clock time into periods demarked by the moment at which exactly f+1 correct nodes have reached a given threshold time t. That is, wall-clock time period t starts the moment any set of exactly f+1 correct nodes have reached threshold time t, and ends once any set of exactly f+1 correct nodes reach threshold time t+1. Because a majority of (f+1) correct nodes must witness a time t message in order for it to be successfully witnessed and delivered to the threshold time and higher layers, and no correct node will witness a time t message after advancing to t+1, this means that a message formulated after the end of global period t can never be successfully witnessed by the required threshold of $T_w$ nodes, and therefore will never be delivered to upper layers on any correct node.

Time release; Schedules information to be revealed at a given threshold time t.

Needed by the public randomness protocol below and indirectly by the consensus protocol, and also generally useful for many other purposes.

In an implementation for a non-Byzantine environment, each node simply labels information with the threshold time it is supposed to be released, and the (trusted) time release layer implementation at each node i is responsible for delaying the release of that information to upper layers until node i has reached the designated release time t. This implementation approach might be suitable in a cluster, cloud, or data center context in which all the nodes' implementations of this layer are under control of the same administrative authority anyway, or in a hardware-attested context such as within SGX enclaves.

The Byzantine-protected distributed implementation we will outline later i instead uses verifiable secret sharing (VSS) together with threshold identiy-based encryption to encrypt the time-release information such that a threshold of nodes must release shares of the decryption key upon advancing to the appropriate time tin order for any node to be able to learn the encrypted information.

Randomness: Builds on cryptographic commitment and time release layer to provide unpredictable, bias-resistant public randomness at each threshold time-step t. Needed both by the consensus protocol below and for many other purposes in practice.

Possible implementation: just pick a random number and transmit via the time release layer. The Byzantine-protected implementation outlined later will instead use verifiable public randomness techniques as in RandHound.

10 Threshold Timestamping

Goal here is to answer existence and temporal precedence questions, as in timeline entanglement. But purely opportunistic timeline entanglement does not provide any guarantee that the system will be able to provide an answer with respect to any two events, even when those two events are well-separated in time, Example: two subsets of nodes might be well-entangled with each other, but rarely or never entangle across the subsets.

Incorporating thresholding logic gives us a way to guarantee that for any two events, if separated across epochs, we will definitely be able to create a Merkle proof that one preceeds the other.

10.1 Fairness and Starvation Avoidance

The starvation problem is that slow nodes might never get to contribute.

We'd like to ensure that even extremely slow nodes get to contribute and entangle their timelines regularly at least once every k epochs for some finite k.

Solution: ensure that when a node is trying to send a message labeled time t and receives evidence that "time has moved on" to time t'>t, the node does not need to start over. Instead, the node should be able to keep the witness acknowledgments or signatures it has fort and just keep using the new signatures it is receiving, keeping track of which (potentially-newer) time each ack/sig is for, and when it has a threshold, just publish that threshold as its contribution to a range of epochs.

Implementation 1: simply use individual signatures.
Implementation 2: use dynarnically-aggregable signatures, such as BLS signatures. Then, just need to keep one aggregate signature per timestep, each with a bitmask. In this case, need to gossip signatures individually during timesteps, but can
Implementation 3: use dynamically-aggregable signatures, but gossip with integer-vectors. In this case, even during gossip, only ever need to send one aggregate sig at a time, together with an integer vector of the number of duplicates of each.

How big do the integers need to be? If we impose the rule that we only aggregate when it's useful—i.e., when at least one previously-zero vector element becomes nonzero in a node's accumulated aggregate signature. This means there can be at most n useful aggregations, and any vector element can hence have been doubled at most n times. We can impose the invariant that in any aggregate with k nonzero vector elements, each vector element must have a value of at most $2^{k-1}$. Thus, each vector element needs at most n bits for n nodes total.

11 Protocol Optimizations and Variations

11.1 Optimized Gossip

Optimizing for minimum number of messages without pairwise chatter: use matrix clocks to bundle up everything that might be new to a target node when sending to them. Optimizing for bandwidth-efficiency in contexts where pairwise relationships are bidirectional channels (e.g., TCP connections): lightweight offer/request/transfer protocol, useNet-like, to avoid transferring big data chunks unnecessarily.

Speculative transmission start: in latter case, perhaps still use matrix clocks and randomized speculative transmission to get transfers started as quickly as possible while maximizing chance that the speculatively transmitted data chunk(s) will be novel to the target.

Ensures that in the case of a triangle inequality violation (TIV), where a link AC proves slower than an indirect path ABC (even just briefly due to a transient failure or slowdown of the AC link), the nodes can opportunistically take advantage of the indirect path.

11.2 Blockchain Consensus

Iteration. Previous block selection. Proposing provisional blocks so that a block gets added even when consensus doesn't succeed (or it may not be universally known that consensus succeeded).

11.3 Pipelinined Consensus

Can initiate a new consensus round in each time-step. Each is resolved only at the Reveal phase at the end.

At the proposal phase, don't yet know the predecessor of the proposed block. But the proposed block fixes everything necessary to choose the predecessor (i.e., the exact set of eligible predecessors), other than the randomness that gets used to choose the precise predecessor. The precise predecessor is chosen later when the randomness for the potential predecessors are revealed; then we just take the predecessor with the numerically smallest ticket.

Application specifically to Fat and Thin Consensus.

Must allow nodes to propose blocks that may innocently conflict with transactions posted within a window of recent timesteps.

The innocently-conflicting transactions are determined only once a committed ordering is established and deterministically evaluated as aborted transactions.

11.4 Fairness, Censorship, and Vector Consensus

An asynchronchronous network adversary can by definition censor all the blocks proposed by up to f honest nodes, But how can we minimize the advantage of censoring adversaries in practice?

First, by ensuring that when honest pairs of nodes are well connected and not vulnerable to delays or DoS attacks, those honest nodes at least cannot be censored.

Second, by ensuring that the adversary's advantage is limited: e.g., even if the adversary can get an outsize proportion of the outputs, it can't get a majority . . . .

11.5 Threshold Key Generation and Regeneration

Initially, assume manual "genesis block" creation event that involves all parties or a manually-chosen threshold set of initial parties.

Then we periodically need to regenerate groups as nodes come and go, or as individual nodes might be found to be compromised and need to be expelled or replaced. The membership might even be automatically-rotating, for example if it is produced from proof-of-work from a ByzCoin-like hybrid consensus mechanism or a proof-of-stake mechanism.

At each regeneration event we have two options: either regenerate only the individual shares while keeping the group's composite public key constant, or generate a fresh public joint public key as well as all shares.

In either case, we have a slight chicken-and-egg problem that we'd in principle like all parties to participate in the DKG or DKR (re-sharing) process, but if we expect all parties to be present, we risk availability and create vulnerabilities to DoS attack. Thus, we'd like to require only a threshold, e.g., 2f+1, of parties to provide contributory polynomials and shares—but then we have the problem of deciding which particular threshold set of 2f+1 polynomials to use, since the choice clearly affects the final distributed key or sharing and we need one but only one.

Hence we have a problem needing consensus, in order to set up for the consensus algorithm we want to run.

One solution is to increase the sophistication of the DKG protocol. But if this DKG or DKR is a periodic process that we normally expect to run merely to set up a next-generation shared key or consensus group while a previous-generation key and consensus group is still in operation, then we can use the previous consensus group to agree on one and only one set of 2f+1 standard key-sharing polynomials for the next-generation group.

11.6 Perrnissioness Membership Protocols

Membership via Proof-of-Work

Membership via Proof-of-Stake

12 Protocol Details

Assume links are TLS or similar encrypted, authenticated, stream connections.

Protocol messages on a given link: (a) time-increment message proposal, containing new upper-level message and bitmap of threshold of messages received from last timestep, hash of timestep signature share, hash of random beacon share; (b) i-want message, indicating updated vector of sequence number ranges of desired and not yet received messages from other nodes; (c) here-is message, containing a message or sig forwarded from some node When I receive a new message via gossip, via any route direct or indirect, I remember which node I received it from, in order to return (signature) responses along the same path.

But I also always (try to) return a signature on the direct link from the message sender.

Bandwidth-conservative policy: request sequence numbers only when I know they exist and want them.

Latency-conservative policy: request all future sequence numbers (upper bounds are infinite) so that peers start sending new messages whenever available.

13 Detailed Analysis of TLC

We define TLC not as a single protocol but a family of protocols. A particular instance $TLC(t_m; t_w; n)$ is parameterized by a message threshold $t_m$, witness threshold $t_w$, and total number of nodes n, where $0 t_m \leq n$ and $0 \leq t_a \leq n$. Intuitively $t_m$ is the number of qualified messages each node must collect from time step s in order to progress to step s+1, and $t_w$ is the number of nodes that must first witness—i.e., acknowledge having seen—each such message in order for it to count towards the tm threshold. We say that an instance of TLC is witnessed if $t_w > 0$ and is unwitnessed otherwise.

For simplicity, we will assume for now that all nodes are correct and leave handling of Byzantine node failures until later in Section 7. To be clear, we allow the network to behave adversarially in its message delivery scheduling, but merely assume for now that none of the N nodes are adversarial.

We introduce the following three properties to analyze progress in terms of the logical time:
1. Monotonicity: Logical time only advances.
2. Pacing: Logical time never advances "too quickly".
3. Liveness: Logical Time Advances Regularly.

The rest of this section is organized as follows: We first explain unacknowledged and then acknowledged TLC. For clarity, we will first describe TLC in a simplified threat model in which the adversary cannot corrupt nodes ($f_c=0$), but can indefinitely delay messages ($f_d \geq 0$). We address Byzantine node failures later in Section 7.

13.1 Network and Threat Model

Consistent with most consensus literature, we assume a wellknown, fixed set of n participating nodes. In practice this consensus group must be chosen somehow, and periodically refreshed or reconfigured for long-term availability and security.

In an open, "permissionless" blockchain setting, for example, consensus groups might be chosen via a rotating window of proof-of-work miners, or by sampling subsets of larger collectives for "scale-out". Consensus group selection and maintenance is outside this paper's scope, however.

13.1.1 Cryptographic Tools

We assume each node i holds a signing key-pair ($K_i$; $k_i$), where node i uses its secret key $k_i$ to sign messages it sends, while all nodes know and use i's public key $K_i$ to verify signatures. We leave key distribution out of scope.

We assume a publicly-verifiable threshold secret sharing scheme which we use to provide a public source of randomness that a threshold Tr of nodes can reveal cooperatively, while fewer than Tr can neither learn any information about nor bias. For simplicity, we assume for now that the secret sharing scheme has been setup by a trusted dealer or some existing distributed key generation (DKG) protocol, but we revisit DKG in the TLC framework later in Section 8.

13.1.2 Threat Model

Our threat model decouples the adversary's power to attack a protocol's progress (liveness and performance) from its power to attack integrity (node and message state), maximizing each attack power independently. This decoupling is analogous to that of UpRight, which distinguishes between failures of omission, or failure to produce or deliver an expected message, from failures of commission, or state corruption. Despite this decoupling we still assume one coordinated adversary, not two: e.g., the adversary can use information learned from attacks on integrity in subsequent attacks on progress.

Our adversary attacks progress via power to schedule and delay message delivery. Asynchronous network models traditionally require that the network eventually deliver all messages, but permanent node or link failures, denial-of-service, and routing attacks realistically can delay communication indefinitely between at least some honest nodes. In addition, asynchronous network models often assume message delivery is arbitrary but non-adversarial: e.g., that the "scheduler is oblivious to the Byzantine process behavior". Advanced network adversaries today such as compromised ISPs or local-area WiFi routers, however, realistically can delay, reorder, and re-play messages adversarially based on all available information including what they learn from corrupted nodes.

Reflecting this reality, our adversary can choose any set $S_d$ of up to $f_d$ (typically f) nodes whose messages it may delay indefinitely; other nodes' messages it must deliver eventually on some adversary-chosen schedule. When any node i sends a message, if $i \notin S_d$, the adversary must schedule the message by committing to some arbitrary future delivery deadline the adversary chooses adaptively. If $i \in S_d$, however, the adversary need not (yet) schedule the message for delivery at all, but can instead hold it indefinitely. Our network adversary is constantly-adaptive, in that it can change its indefinite-delay set at any time. Whenever the adversary changes its set from $S_d$ to $S'_d$, the adversary must immediately schedule and commit to some delivery deadline for in-flight messages of nodes leaving the indefinite-delay set ($S_d$; $S'_d$); otherwise the adversary could trivially delay all messages indefinitely. Once a message is scheduled for delivery, the adversary can advance the message's delivery deadline at any time (e.g., to reorder messages adaptively), but cannot further delay delivery beyond the message's committed deadline.

The adversary attacks integrity via the power to corrupt nodes, and messages they send, adaptively. All N participating nodes start out honest, following the prescribed protocol.

The adversary can corrupt honest nodes adaptively at any time, choosing when and which honest node(s) to corrupt next based on any information it has learned up to the point of corruption. Once corrupted, the adversary learns all the node's secrets including private keys, and can produce arbitrary messages signed by the node. Because leaked secrets cannot be un-leaked, the node remain corrupted for the consensus group's remaining lifetime. While periodic group reconfiguration and key refresh can enable recovery from corruption in practice, we leave such mechanisms out of scope. The adversary can corrupt at most $f_c$ nodes, a parameter usually set to a global fault-tolerance threshold f. The adversary can replace in-flight messages sent by the corrupted node, up to the moment of delivery to honest nodes.

This implies that the adversary can equivocate by delivering different correctly-signed messages to different honest receivers.

Corruption power alone affects only node and message state, not timing. Even corrupted nodes must produce some message whenever the protocol requires one, although the adversary's progress-attack power above can delay its delivery indefinitely. We define a message's label as its metadata uniquely identifying the message's role and logical position in the protocol, i.e., a type of message other nodes may expect and wait for. Changing a message's label from I to I' constitutes both an attack on integrity (a failure of commission) and an attack on progress (a failure of omission), as other nodes expecting a message with label I may never see one. To model this reality, our attacker can corrupt message labels only if it also keeps the sending node in its indefinite-delay set until and unless the corrupt node subsequently delivers to all recipients some message with the orginally-expected label I.

Because the indefinite-delay set Sd is independent of the corrupted node set Sc, the adversary has "attack powers" over up to 2f nodes: state corruption power over up to $f_c=f$ nodes and indefinite-delay power over up to $f_d=f$ additional nodes, with constantly-adaptive control over the latter set. Constraining our adversary to set Sd equal to the set of corrupted nodes Sc at all times reduces its power to that of conventional adaptive adversaries who can indefinitely delay only messages from corrupt nodes. Allowing the adversary indefinite delay power ($f_d>0$) without corruption power ($f_c=0$) emulates a classic asynchronous network with $f_d$ fail-stop nodes.

While the above describes our main "target" threat model, we will use weakened versions of this threat model in developing straw-man or simplified protocols below for expository purposes, stating in each case any special constraints we place on the adversary.

13.2 Unacknowledged TLC (Fail-Stop Case)

In unacknowledged TLC, where $t_1=0$, a node i broadcasts an application-defined message $m_S$; every time it reaches a new time slot s≥0. At the beginning of time, all nodes have both the right and obligation to broadcast an initial message labeled s=0.

Each node i, after having sent a message $m_{si}$ for a given time slot s, has the following two options to have both the right and obligation to advance its logical time:

1. Receive messages $m_{sj}$ from t least $t_m$ distinct nodes j≠i to advance from s to s+1.
2. Receive a message $m_{s'j}$ from at least one other node j to advance to s'>s while skipping any intervening time slots strictly between s and s' that i might have missed.

While the first rule realizes regular collaborative time progression by at least $t_m$ nodes, the second one introduces a viral time synchronization mechanism, as with Lamport clocks, enabling nodes to catch-up quickly with their peers if necessary. Note that network communication alone drives each node's advancement of logical time. If the application protocol layered atop TLC does not have anything useful to send when node i satisfies the conditions to advance from time s to s+1, then TLC advances time anyways and broadcasts an empty application message $m_{s+1;i}$. Further note that the adversary can prevent individual nodes from advancing their notion of time by delaying the delivery of up to $f_d$ nodes' messages indefinitely, as discussed above in Section 13.1.2.

13.2.1 Time Progress Properties

We now analyze each of the initially introduced time progression properties.

Monotonicity: We wish to ensure that for all TLC nodes, time only ever advances when it changes at all: i.e., if a node i has logical time s at some real-world moment m and has logical time s' at some later moment m'>m, then s'≥s. The rules of time advancement trivially ensure monotonicity.

Pacing: We wish to ensure that no node or set of nodes smaller than tm can "race ahead" of the rest. Specifically, at the moment any node i advances to time s+1, we require that there exist at least tm nodes at time at least s (i.e., no more than one time-step behind i). This property is ensured by an inductive argument over time-steps and the two conditions above for time to advance. Ensuring this property will become less trivial later when we consider Byzantine node corruptions.

Liveness: We wish to ensure that TLC can never "get stuck," such that all nodes stop advancing forever, despite the adversary's ability to schedule messages arbitrarily and indefinitely delay the broadcasts of up to $f_d$ nodes. Unacknowledged TLC satisfies this property provided $n-f_d≥t_m$, which we can prove by contradiction.

For TLC to get stuck, there must be some last moment m in real-world time when any node makes progress by advancing its logical time. Let L be the set of live nodes that are not in the adversary's indefinite-delay set continuously forever from moment rn on. Since at most $f_d$ nodes can be in the indefinite-delay set continuously forever from m, clearly $|L|≥t_m$. By moment m, each node i 2 L has broadcast some message Mi the last time i advanced its logical time. Since the nodes in L are not indefinitely delayed forever, each final broadcast $M_i$ is eventually delivered to all nodes in L. Let m' be the moment the last of these final broadcasts is delivered to the last recipient in L. If at m all nodes in L were at the same logical time s, then by m' each node in L has received a threshold $t_m$ of time s messages and will advance to time s+1. If at m the nodes in L were at varying logical times, then by m' the final broadcast of some node n∈L that was at the highest logical time s at m will have reached some other node n'∈L that was at a lower logical time s'<s at m, causing n' to advance its time to s virally. Either way, by m' at least one node in L has advanced its logical time beyond its state at moment m, contradicting the original assumption that no node's logical time increases after moment m, and thus proving TLC's liveness.

Because "final" messages from all nodes in L must be in flight (if not already delivered) by moment m, and the adversary must schedule those messages for delivery if a node leaves the indefinite-delay set even momentarily (Section 13.1.2), the adversary must eventually deliver these messages despite any changes to its indefinite-delay set. Further, the set L can be different from one progress event to the next, so changing the indefinite-delay set continuously does not help the adversary across progress events.

13.3 Acknowledged TLC (Fail-Stop Case)

| |
|---|
| Upper Level Protocol (ULP) |
| Threshold Logical Clock Protocol |
| Witness Cosigning Protocol |
| Overlay/Network Protocol (ONP) |

The unacknowledged TLC protocol above makes it easy to reason about the amount of information that propagates to a particular node across logical time-steps. That is, whenever any node i reaches some logical time s+1, we know that i has "seen" and learned information from the viewpoints of at least $t_m$ nodes at prior logical time s. However, in unacknowledged TLC it is not so trivial to reason about information propagation from a particular node into the future. That is, once any node i has reached and broadcast a message at time s, how many nodes will have seen that message by time s+1⁈

To make it easy to reason in both directions across logical time-steps, acknowledged TLC requires nodes to waft longer before advancing time to gather information on who has seen which messages. In an acknowledged TLC instance $TLC(t_m; t_a; n)$ where $t_a>0$, each node at time s waits not only to receive $t_m$ messages from distinct nodes at time s, but also to receive at least ta acknowledgments of each of these messages from distinct nodes. Thus, for any node i to progress from s to s+1, not only must i have seen $t_m$ messages from time s, but i must know that not only i itself but a threshold of ta nodes have seen each of those $t_m$ messages. Since each of these $t_m$ messages requires $t_a$ acknowledgments, i must effectively build a $t_m×t_a$ matrix of acknowledgments before it is allowed to advance to time slot s+1.

When any node i reaches logical time slot s, it broadcasts a time-progress message $m_{si}$ with an upper-level payload as in unacknowledged TLC, then starts waiting for the messages and acknowledgments of other nodes. Until i advances to s+1 it broadcasts an acknowledgment $a_{sij}$ for any message $m_{sj}$ it receives from any other node j≠i that i has not already seen.

Node i continues acknowledging all new messages $m_{sj}$ it sees even after having received tm messages at time s, because i does not know who will see which of its acknowledgments first. Further, i collects all acknowledgments $a_{sij}$ for all messages $m_{sj}$, because i does not know for precisely which set of tm messages it will first be able to collect $t_a$ acknowledgments each. Even if some message $m_{sj}$ arrives early at i, its $t_a$ supporting acknowledgments might arrive late. The acknowledgments i collects supporting each of the $t_m$ messages can be from different sets of nodes: each message m need only have supporting acknowledgments from any set of at least $t_a$ nodes.

Once a node i collects tm messages with a "complete matrix" of $t_m \times t_a$ supporting acknowledgments, i progresses to time slot s+1 and stops either collecting or sending further acknowledgments at slot s. Other nodes will thus no longer be able to get new acknowledgments from i, and may be unable to build a complete acknowledgment matrix at slot s once too many other nodes have reached slot s+1. This is not a problem, however, because any lagging node catches up to slot s+1 virally upon seeing any time slot s+1 broadcast, as in unacknowledged TLC.

13.3.1 Time Progress Properties

Acknowledged TLC satisfies the same key properties of monotonicity, pacing, and liveness as discussed in Section 13.2.1. The arguments for the first three properties are identical for unacknowledged and acknowledged TLC, because the latter only adds new constraints on the advancement of logical time, i.e., "slowing time further." We must adjust the liveness argument slightly, however.

Liveness: TLC satisfies liveness provided $t_m \le n-f_d$ and $t_a \ge n-f_d$. Acknowledged TLC has two types of progress events. A node makes time progress when it advances from time s to s+1 and broadcasts an upper-layer message at s+1. A node at time s makes message progress when it receives a time s message it hasn't yet seen and broadcasts an acknowledgment to it. Since a node can make message progress at most n times consecutively before it must instead make time progress, showing that a node must regularly encounter any progress event suffices to ensure that it regularly makes time progress.

For TLC to get stuck, there must be some moment m of the last progress event any node reaches. Let L be the set of live nodes not in the adversary's indefinite-delay set continuously from m on forever. By the above requirements, $|L| \ge t_m$ and $|L| \ge t_a$. Let m' be the moment the last message broadcast by any node in L is delivered to its final recipient in L. If at m there were nodes at different logical times s'<s, then by m' the last broadcast of some node i at s will reach some node j at s' and virally advance j to time s. If at m all nodes in L are at the same time s and each have received and acknowledged time s messages from all nodes in L, then by m' all nodes in L have collected a complete $t_m \times t_a$ matrix of acknowledgments and progressed to time s+1. Otherwise, at rn all nodes in L are at the same time s but there is some node i in L whose time s message has not yet been acknowledged by some other node j in L. By moment m' node j will receive this message from i, thus making message progress. In all of these cases, at least one node eventually makes either time or message progress, contradicting the assumption and ensuring liveness in acknowledged TLC.

13.4 Consensus Protocol Analysis

Probability of Success without Equivocation

Node i has the information to evaluate these conditions by step s+2, even though the round does not actually complete until s+3. A node i thus concludes a consensus round to have definitely committed by time s+3 if it has learned information from any node—itself or another—that these conditions were satisfied by time s+2. There are many such nodes j that might have observed this at s+2 and from whom node i might subsequently learn it from—but the probability that i learns this fact from at least one such node j is conservatively no less than the probability that any particular node j observes it directly at time s+2. For simplicity, we thus focus on the latter event's probability.

To simplify the analysis further we will consider a more specific event that is sufficient, but not strictly necessary, for a particular node j to observe the necessary conditions at t+2: namely, that the time t proposal with the globally lowest lottery ticket value is double-certified and that fact is observed by node j by t+2. By TLC's protocol construction, node j waits for a threshold number of time t+1 messages to be threshold certified and collected by j before advancing to t+2.

By the same logic as above, the probability that at least one of these time t+1 messages observes the certification of the globally-lowest proposal pis no less than the probability that any particular node kin the same set observes p to be certified. Since node k in turn collected a threshold of certified time t proposals in order to advance to t+1, and the probability of each proposal having the globally lowest lottery ticket is uniformly random because all lottery tickets are drawn from the same distribution, the probability of the original node i observing success is at least the threshold fraction: 1=2 for non-Byzantine and 2=3 for Byzantine consensus.

We assume here that the lottery ticket entropy or value distribution is large enough that the probability of two randomly chosen lottery tickets colliding is negligible. This assumption is not necessary: compensating for its absence would merely involve adjusting the overall probability of success accordingly, since a collision between two lowest-valued lottery tickets simply increases the probability or consensus failure accordingly.

The "less than or equal" condition for a potentially-uncertified time t proposal p' to prevent a certified time t proposal p from being considered definitely committed ensures that the hopefully-unlikely case of a lottery tie, neither winning proposal can be considered committed by any node.

Probability of Success with Equivocation:

At t+1, with all f faulty nodes equivocating, we could produce (2f+1) different equivocating views of t+0, each for the benefit of one of the honest nodes, each view containing f unique equivocating proposals from the faulty nodes, for a total of up to (f)(2f+1) different faulty proposals via equivocation. However, an attack this aggressive will result in the equivocation being detected immediately at time t+2, because each t+2 view would have to include more than one (in fact f+1) of these different equivocating views. Thus, none of the (f)(2f+1) proposals would be deemed eligible by any honest node at time t+2, and the attack would accomplish nothing but eliminate the equivocating nodes.

A slightly less aggressive equivocation attack is for the f faulty nodes to conspire in creating only (f+1) different equivocating views of t+0, each again with a different set off proposals from the faulty nodes, for a total of up to (f)(f+1) different faulty proposals via equivocation. At t+1, the network adversary arranges that a set of f honest nodes see only honest proposals from time 0, and hence are "uncolored" by any of the equivocating views and thus compatible with all of them. The other f+1 honest nodes at t+1 each see a different equivocating view, each producing a self-consistent viewpoint off unique equivocating proposals, one honest proposal "colored" by this view, and the f "uncolored" honest proposals. Further, the network adversary can arrange that each of the (f)(f+1) resulting adversary proposals appears eligible to (different subsets of) correct nodes at t+2, each of these based on evidence that each of the f faulty nodes (wearing their correctly-colored hats) and the one appropriately colored honest node had seen each of the equivocating adversarial proposals by t+1.

Although at most one proposal can only emerge as definitely committed by t+3, the existence of these (f)(f+1) equivocating but apparently eligible adversary proposals at t+3 can increase the adversary's chances of one of its proposals winning the lottery to (f)(f+1)/(f+1)(f+1), or f/(f+1), leaving the f+1 correct proposals in a time t+3 view only a 1/(f+1) chance of winning. Further, this aggressive attack would guarantee that all f faulty nodes are exposed as equivocating and eliminated by t+3, so the adversary would expend its entire DoS attack capability in one round.

The adversary could equivocate with fewer of its nodes, thereby reserving the rest for future attacks, but this would correspondingly decrease the DoS attack's impact. For example, if the adversary uses only f/2 nodes to equivocate, then it can use them to support (f/2)(f+1) eligible equivocating proposals in (f+1) views together with (f/2+f) uncolored correct proposals. Maximizing the adversary's equivocating proposals in a t+3 view would include the (f/2)(f+1) equivocating adversary proposals together with the f+1 correct proposals of the honest nodes that saw and accepted these views at t+2, giving the adversary a probability of (f/2)/(f/2+1) that one of its eligible equivocating proposals wins at t+3.

Additional Features and Terminology

Depending on the embodiment, certain acts, events, or functions of any of the algorithms described herein can be performed in a different sequence, can be added, merged, or left out altogether (for example, not all described acts or events are necessary for the practice of the methods). Moreover, in certain embodiments, acts or events can be performed concurrently, for instance, through multi-threaded processing, interrupt processing, or multiple processors or processor cores or on other parallel architectures, rather than sequentially. In addition, different tasks or processes can be performed by different machines or computing systems that can function together.

The various illustrative logical blocks and nodes described in connection with the embodiments disclosed herein can be implemented or performed by a machine, a microprocessor, a state machine, a digital signal processor (DSP), an application specific integrated circuit (ASIC), a FPGA, or other programmable logic device, discrete gate or transistor logic, discrete hardware components, or any combination thereof designed to perform the functions described herein. A hardware processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The invention claimed is:

1. A method comprising:
assigning a logical time step to one node among a plurality of nodes in an asynchronous network,
wherein the logical time step is represented by a monotonically-increasingly integer,
wherein the node is only authorised to increment its logical time step after an asynchronous coordination with a number of nodes equal or superior to a first predefined threshold, wherein said node reaches a next logical time step and broadcasts a further message for asynchronous coordination only after having received messages broadcasted at a given logical time step by a number of nodes equal or superior to the first predefined threshold, wherein the node stores its history in a blockchain, that grows by one record at each logical time step, wherein the said nodes each broadcast a potential value to agree on, then wait a number of logical time steps, recording in a blockchain and broadcasting their observations at each step, before deciding independently on a value to agree on.

2. The method of claim 1, wherein said node (i) is only authorised to increment its logical time step after said node has seen one of its messages acknowledged by a number of other nodes larger than a second predefined threshold.

3. The method of claim 1, wherein different nodes reach a given logical time step (s) a at different real-world times.

4. The method of claim 3, further comprising a step of delineating the real-word time into periods according to the moment a majority of the nodes in the network have asynchronously reached successive logical time steps.

5. The method of claim 1, wherein the first predefined threshold is larger than half the number of nodes in the asynchronous network, so that the node is only authorised to reach its next logical time step after having received messages asynchronously from a majority of nodes in said network from the previous logical time step.

6. The method of claim 1, in which said node maintains a tamper-evident log in which each entry is digitally signed by the node and linked to prior entries by a hash, to enable other nodes to replay and verify the node's decisions.

7. The method of claim 1, wherein said logical time steps are used to build an asynchronous time service for trustworthy clock initialization or synchronization.

8. The method of claim 1, wherein said logical time steps are used in an encrypted time vault or time capsule service enabling clients to encrypt data that can only be decrypted at a specific future time.

9. The method of claim 1, wherein said logical time steps are used to build a timestamping service enabling clients to prove that a specific data existed at a specific time.

10. A programmable equipment implementing a node and programmed so as to perform the method of claim 1.

11. A system comprising a plurality of nodes according to claim 10, mutually connected over a network.

12. The method of claim 1, the method for assigning a logical time step being asynchronous to the real world time.

* * * * *